United States Patent
Watanabe et al.

(10) Patent No.: US 12,450,278 B2
(45) Date of Patent: Oct. 21, 2025

(54) INFORMATION PROCESSING METHOD AND INFORMATION PROCESSING APPARATUS

(71) Applicant: KABUSHIKI KAISHA TOSHIBA, Tokyo (JP)

(72) Inventors: Nayuko Watanabe, Kawasaki Kanagawa (JP); Nao Mishima, Tokyo (JP); Reiko Noda, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 18/454,804

(22) Filed: Aug. 24, 2023

(65) Prior Publication Data
US 2024/0193200 A1   Jun. 13, 2024

(30) Foreign Application Priority Data
Dec. 8, 2022 (JP) .................. 2022-196610

(51) Int. Cl.
G06F 16/00 (2019.01)
G06F 16/334 (2025.01)
G06F 16/353 (2025.01)

(52) U.S. Cl.
CPC .......... *G06F 16/353* (2019.01); *G06F 16/334* (2019.01)

(58) Field of Classification Search
CPC ............................ G06F 16/353; G06F 16/334
USPC ............................................. 707/737
See application file for complete search history.

(56) References Cited

U.S. PATENT DOCUMENTS

| | | | |
|---|---|---|---|
| 6,763,148 B1 * | 7/2004 | Sternberg | G06V 20/00 707/E17.02 |
| 2007/0177807 A1 * | 8/2007 | Enomoto | G06V 10/772 382/190 |
| 2010/0250539 A1 * | 9/2010 | Zhou | G06F 16/5866 707/769 |
| 2018/0213162 A1 * | 7/2018 | Tsutsumitake | H04N 23/811 |
| 2019/0026682 A1 * | 1/2019 | Ike | G06Q 10/06313 |
| 2019/0272334 A1 * | 9/2019 | Yasuoka | G06F 16/435 |
| 2020/0327327 A1 * | 10/2020 | Wu | G06N 20/10 |
| 2020/0372070 A1 | 11/2020 | Liu | |
| 2022/0129693 A1 | 4/2022 | Pham et al. | |

FOREIGN PATENT DOCUMENTS

| | | | |
|---|---|---|---|
| JP | 2014092909 A | | 5/2014 |
| JP | 2015092395 A | * | 5/2015 |
| JP | 7014232 B2 | | 2/2022 |
| WO | WO-2018203510 A1 | * | 11/2018 ......... G06F 16/3329 |

OTHER PUBLICATIONS

Japanese Office Action (and an English language translation thereof) dated Aug. 12, 2025, issued in counterpart Japanese Application No. 2022-196610.

* cited by examiner

*Primary Examiner* — Monica M Pyo
(74) *Attorney, Agent, or Firm* — Holtz, Holtz & Volek PC

(57) ABSTRACT

According to one embodiment, an information processing method includes acquiring a first question corresponding to an input query, estimating an answer to the first question for each of pieces of content to generate a first answer estimation result including the answer to the first question for each of the pieces of content, and classifying the pieces of content into first groups by using the first answer estimation result and generating a first retrieval result indicating content belonging to each of the first groups.

17 Claims, 24 Drawing Sheets

| Question ID | Question |
|---|---|
| 1 | Is he/she wearing helmet |
| 2 | How many people are working |
| 3 | Is he/she wearing safety belt |
| ⋮ | ⋮ |

FIG. 2

| Answer ID | Image ID | Question ID | Answer |
|---|---|---|---|
| 1 | 1 | 1 | Yes |
| 2 | 1 | 2 | Two people |
| 3 | 2 | 1 | No |
| ⋮ | ⋮ | ⋮ | ⋮ |

FIG. 3

| Answer ID | Image ID | Question ID | Answer | Certainty factor |
|---|---|---|---|---|
| 1 | 1 | 1 | Yes | 0.9 |
| 2 | 1 | 1 | No | 0.1 |
| 3 | 1 | 2 | Two people | 0.8 |
| 4 | 1 | 2 | One person | 0.2 |
| 5 | 2 | 1 | No | 0.9 |
| 6 | 2 | 1 | Yes | 0.1 |
| ⋮ | ⋮ | ⋮ | ⋮ | ⋮ |

FIG. 4

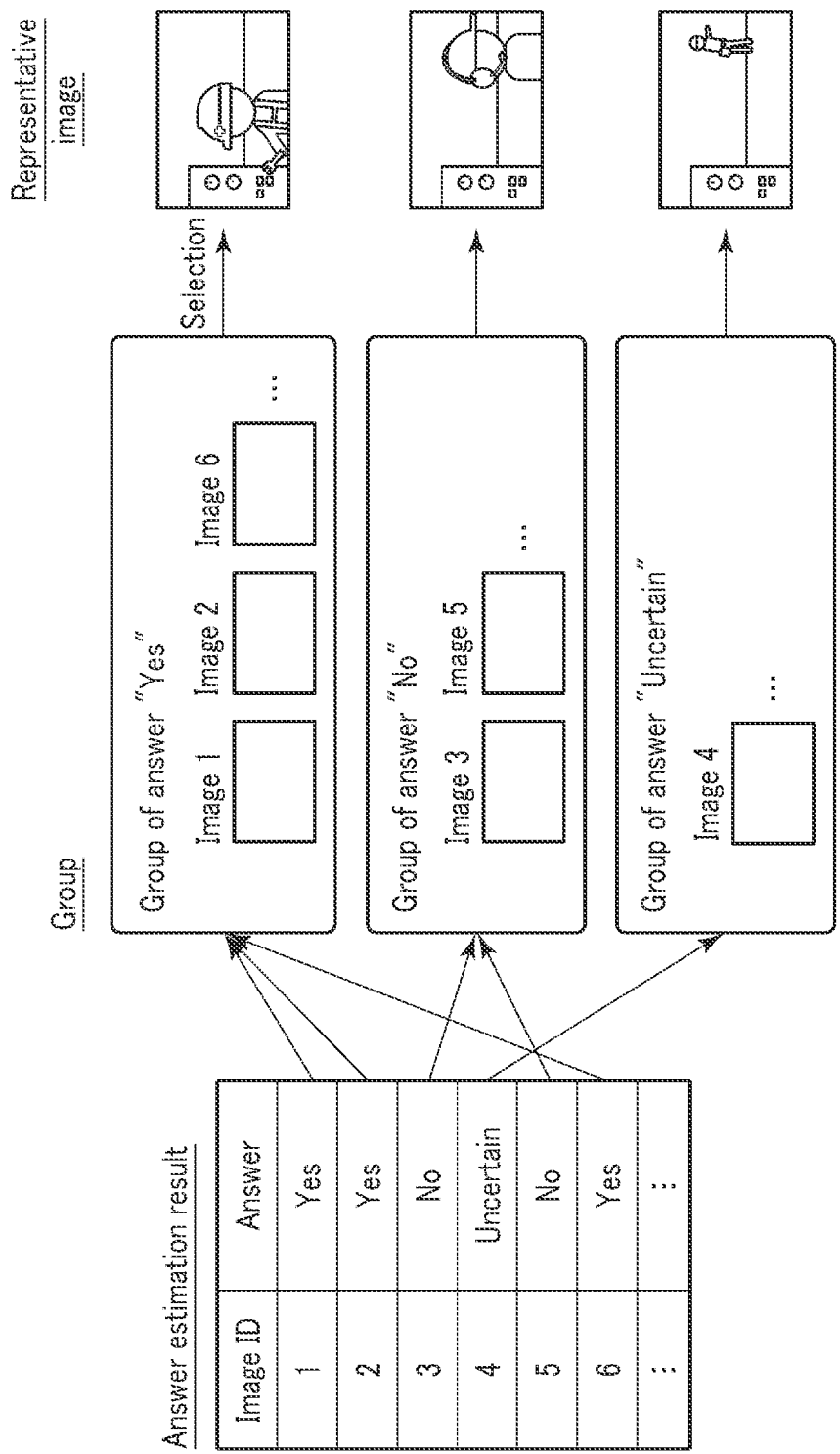
F I G. 5

Answer estimation result

| Image ID | Answer | Certainty factor |
|---|---|---|
| 1 | Yes | 0.9 |
| 1 | No | 0.1 |
| 2 | Yes | 0.5 |
| 2 | No | 0.4 |
| 3 | No | 0.8 |
| 3 | Yes | 0.2 |
| ⋮ | ⋮ | |

Group

Group of answer "Yes"

| Image 1 | Image 2 | Image 3 | |
|---|---|---|---|
| 0.9 | 0.5 | 0.2 | ⋯ |

Group of answer "No"

| Image 3 | Image 2 | Image 1 | |
|---|---|---|---|
| 0.8 | 0.4 | 0.1 | ⋯ |

F I G. 13

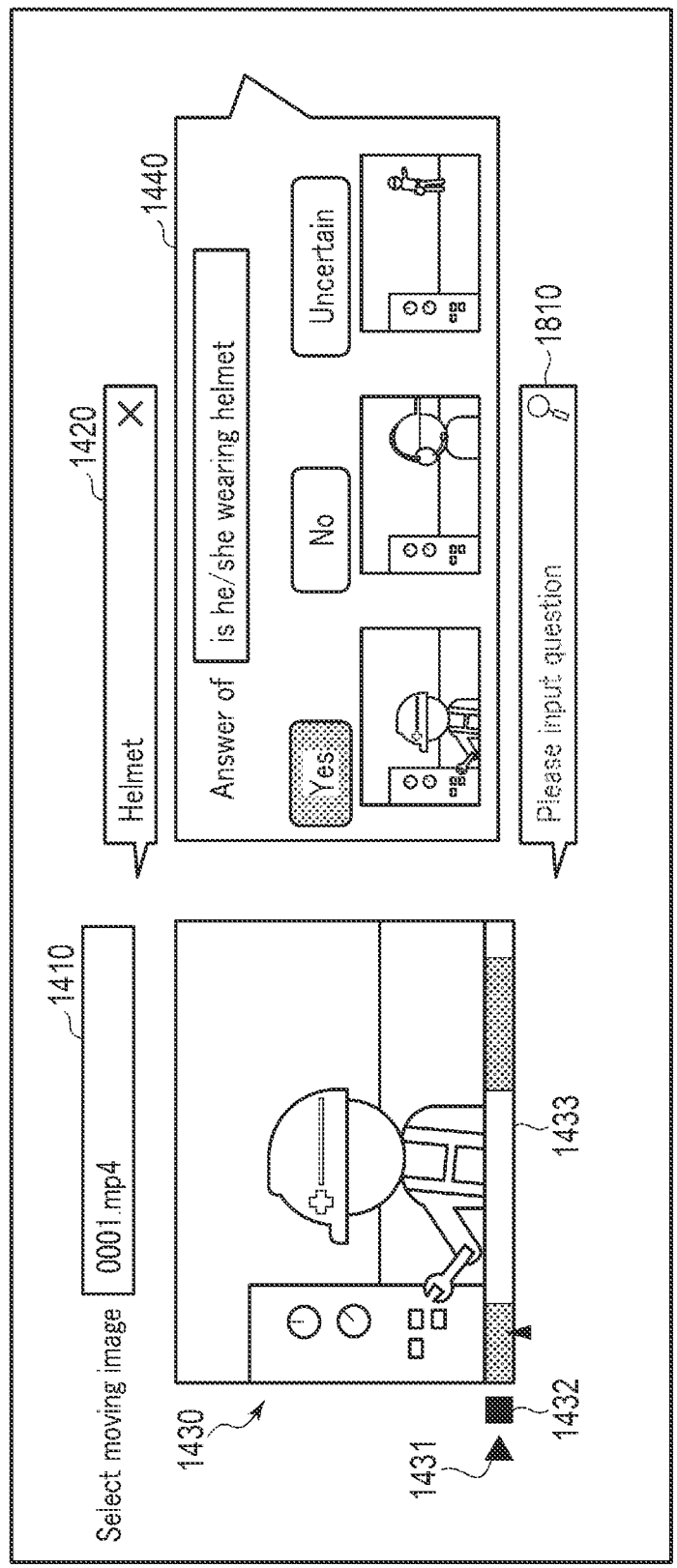
F I G. 17

| Question ID | Question | Registration date and time | Number of times of selection | Category |
|---|---|---|---|---|
| 1 | Is he/she wearing helmet | 2022/08/04 13:00:40 | 20 | Factory, construction |
| 2 | How many people are working | 2022/08/04 13:04:12 | 30 | Factory, construction, office |
| 3 | Is he/she wearing safety belt | 2022/08/04 13:05:53 | 14 | Factory, construction |
| ⋮ | ⋮ | ⋮ | ⋮ | ⋮ |
| 101 | Is he/she wearing sneakers | 2022/09/13 10:02:01 | 2 | Fashion |
| ⋮ | ⋮ | ⋮ | ⋮ | ⋮ |

F I G. 21

| Question ID | Use date and time | User ID |
|---|---|---|
| 1 | 2022/08/04 13:00:40 | 1 |
| 1 | 2022/08/08 15:22:31 | 3 |
| 2 | 2022/08/09 10:47:58 | 1 |
| ⋮ | ⋮ | |

F I G. 22

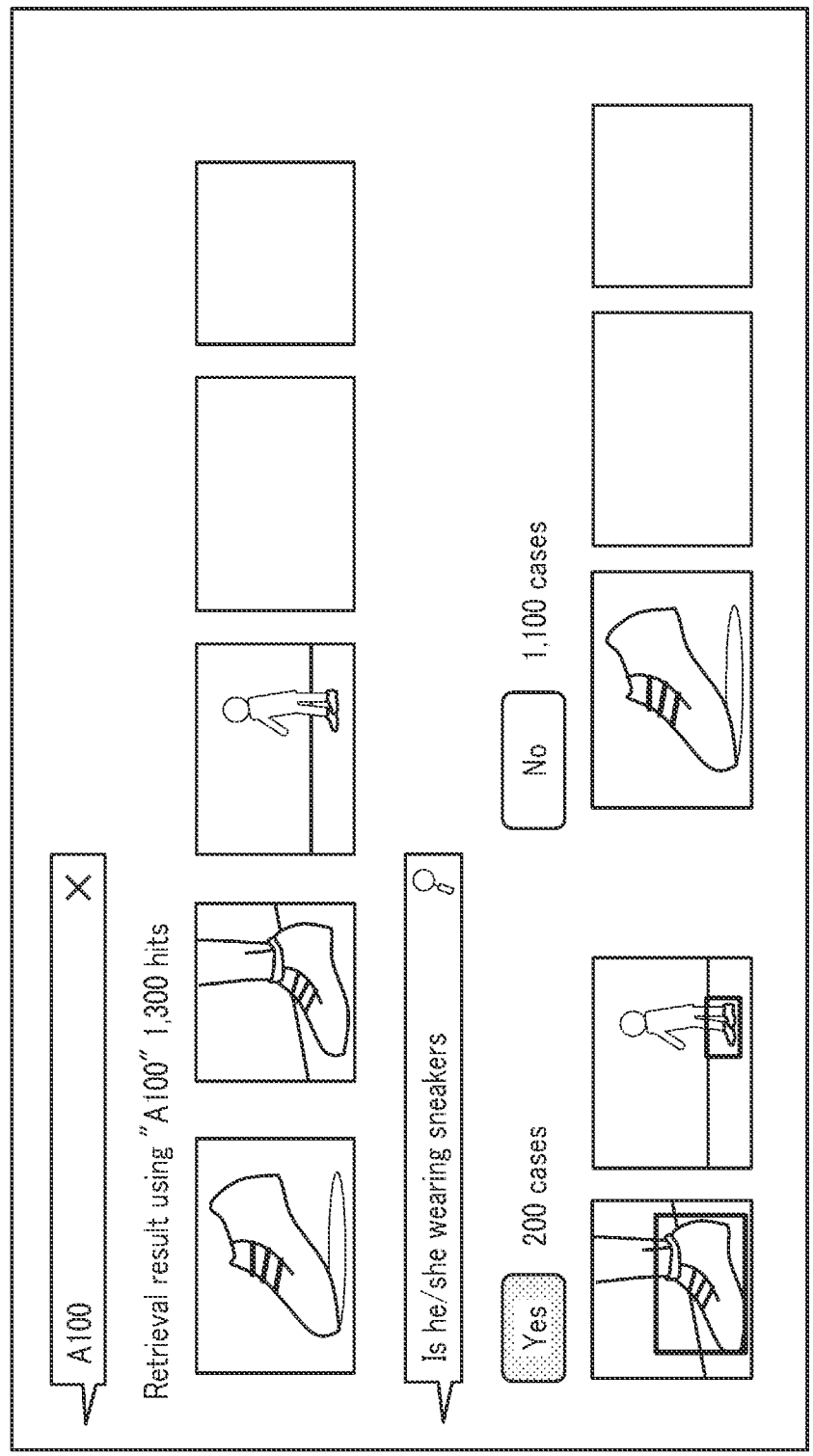
F I G. 25

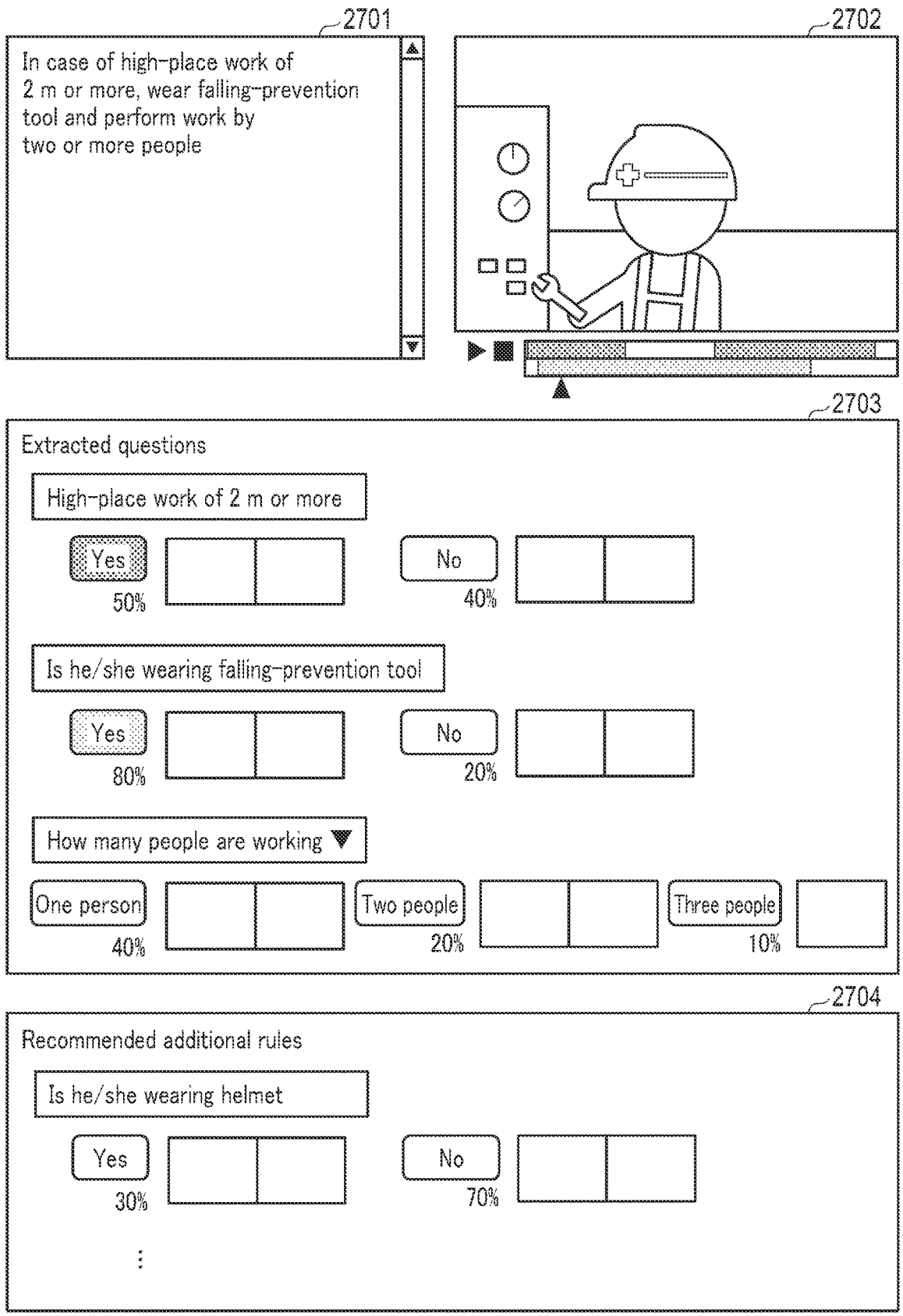
F I G. 27

INFORMATION PROCESSING METHOD AND INFORMATION PROCESSING APPARATUS

CROSS-REFERENCE TO RELATED APPLICATION

This application is based upon and claims the benefit of priority from Japanese Patent Application No. 2022-196610, filed Dec. 8, 2022, the entire contents of which are incorporated herein by reference.

FIELD

Embodiments described herein relate generally to an information processing method and an information processing apparatus.

BACKGROUND

There is a need to search for scenes that meet or don't meet a specific condition such as "Putting on a helmet" for moving images on site captured by a camera installed at a manufacturing site, a maintenance site, or the like. In addition to the scene retrieval for the moving images on site, there is also a need to retrieve scenes that meet or don't meet a specific condition from moving images in a moving image sharing site.

Meanwhile, there are services of retrieving images using keywords as a query and services of retrieving images similar to an input image. The image retrieval technology used in these services can be applied to a frame image of a moving image for scene retrieval from the moving image.

However, conventional technologies such as image retrieval using a keyword and similarity-based image retrieval cannot retrieve images or scenes that do not meet specific conditions.

BRIEF DESCRIPTION OF DRAWINGS

FIG. 2 is a diagram illustrating information stored in a question storage unit according to the first embodiment.

FIG. 3 is a diagram illustrating information stored in an estimation result storage unit according to the first embodiment.

FIG. 4 is a diagram illustrating information stored in the estimation result storage unit according to the first embodiment.

FIG. 5 is a diagram for explaining processing in a grouping unit according to the first embodiment.

FIG. 13 is a diagram for explaining the image retrieval method illustrated in FIGS. 12A and 12B.

FIG. 17 is a diagram illustrating a retrieval screen according to the second embodiment.

FIG. 21 is a diagram illustrating information stored in a question storage unit according to the third embodiment.

FIG. 22 is a diagram illustrating information stored in a question storage unit according to the third embodiment.

FIG. 25 is a diagram illustrating application of an information processing technology according to an embodiment.

FIG. 27 is a diagram illustrating a screen according to a fourth embodiment.

DETAILED DESCRIPTION

According to one embodiment, a non-transitory computer readable medium including computer executable instructions, wherein the instructions, when executed by a processor, cause the processor to perform an information processing method. The information processing method includes acquiring a first question corresponding to an input query, estimating an answer to the first question for each of pieces of content to generate a first answer estimation result including the answer to the first question for each of the pieces of content, and classifying the pieces of content into first groups by using the first answer estimation result and generating a first retrieval result indicating content belonging to each of the first groups.

Hereafter, embodiments will be described with reference to the accompanying drawings. In the embodiments described below, content to be retrieved is an image. The content to be retrieved may be other data such as text and audio.

First Embodiment

Figure 1:
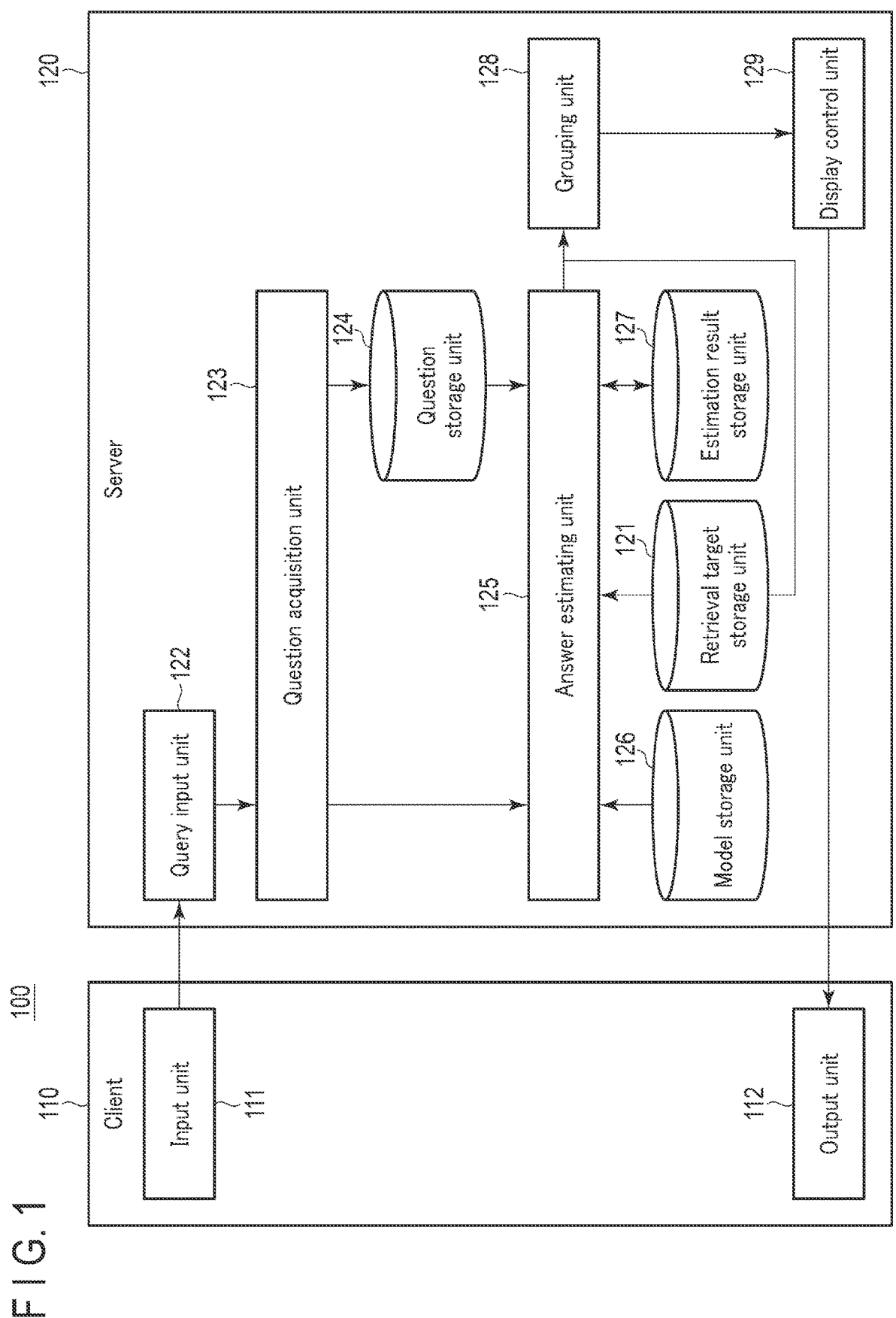
FIG. 1 is a block diagram illustrating an information processing system according to a first embodiment.

FIG. 1 schematically illustrates an information processing system 100 according to a first embodiment. As illustrated in FIG. 1, the information processing system 100 includes a client 110 and a server 120 corresponding to an information processing apparatus according to the first embodiment. The client 110 and the server 120 are connected to a communications network, which may include the Internet, and communicate with each other via the communications network.

The server 120 implements an image retrieval function for performing an image retrieval in response to a query input, and provides an image retrieval service to the client 110. For example, the image retrieval function is implemented in the server 120 as a web application, and the client 110 accesses the image retrieval service by using a web browser. When the client 110 accesses the image retrieval service, a screen including a text input form for inputting a query in a text form is displayed on the web browser. When a user inputs a query into the text input form, the server 120 receives a query input by the user (hereinafter also referred to as an input query) from the client 110, and performs image retrieval using the received input query to obtain a retrieval result. The server 120 adds the retrieval result to the screen in order to present the retrieval result to the user through the client 110.

The image retrieval function is implemented in the server 120 in the example illustrated in FIG. 1, but may be implemented in a local computer such as the client 110 illustrated in FIG. 1. In a case where the image retrieval function is implemented in a local computer, the image retrieval function may be implemented as an application executed on the local computer.

The client 110 is a computer such as a personal computer (PC) or a smartphone. The client 110 includes an input unit 111 and an output unit 112. The input unit 111 includes an input device that enables a user to input information. Examples of the input device include a keyboard, a mouse, a touch panel, and a microphone. The input unit 111 is used to input a query. The output unit 112 includes an output device that outputs information to the user. Examples of the output device include a display device and a speaker. In the first embodiment, the output unit 112 includes a display device, and the display device is used to display a retrieval screen generated by the server 120.

The server 120 includes a retrieval target storage unit 121, a query input unit 122, a question acquisition unit 123, a question storage unit 124, an answer estimating unit 125, a model storage unit 126, an estimation result storage unit 127, a grouping unit 128, and a display control unit 129. Note that the server 120 is not limited to being implemented as a single device (for example, a computer), and may be configured by a plurality of devices. The retrieval target storage unit 121, the question storage unit 124, the model storage unit 126, and the estimation result storage unit 127 may be provided in an external device such as a cloud storage.

The retrieval target storage unit 121 stores a plurality of images to be retrieved (specifically, still images) in association with image IDs. The image ID is identification information for identifying an image. For example, $N_I$ images having image IDs of 1 to $N_I$ are stored in the retrieval target storage unit 121.

The query input unit 122 is a user interface for inputting a query. In a case where the query is in a text form, the query input unit 122 may be the above-described text input form. The text input as the query may be either a keyword or a sentence. The sentence may be any of an affirmative sentence, an interrogative sentence, and a negative sentence.

The question acquisition unit 123 acquires a question corresponding to the query input by the user. Specifically, the question acquisition unit 123 converts the input query into a question in a predetermined form. The predetermined form indicates a form that can be handled by the answer estimating unit 125 in the subsequent stage. In the first embodiment, the form that can be handled by the answer estimating unit 125 is text, and the question acquisition unit 123 converts the input query into a question sentence (a question in a text form).

Whether the input query is a keyword or a sentence can be determined by performing morphological analysis on the input query and confirming the distribution of parts of speech. In addition, whether the sentence is an affirmative sentence, an interrogative sentence, or a negative sentence can be determined depending on whether there is an interrogation word or whether there is a negative expression. Other determination methods such as determination using a model learned by machine learning may be used.

In a case where the input query is an interrogative sentence, the question acquisition unit 123 uses the input query as it is as a question sentence.

In a case where the input query is an affirmative sentence or a negative sentence, the question acquisition unit 123 converts the input query into an interrogative sentence and uses the interrogative sentence as a question. A method of converting an affirmative sentence or a negative sentence into an interrogative sentence may be to add an interrogative final particle "text1" (shown below) to the end of the sentence. For example, an interrogative sentence "text2" (shown below) is obtained by adding a final particle "text1" to the affirmative sentence "text3" (shown below).

text1: か text2: ヘルメットを装着しているか, which corresponds to "Is he/she wearing a helmet".

text3: ヘルメットを装着している, which corresponds to "He/She is wearing a helmet".

As another method of converting an affirmative sentence or a negative sentence into an interrogative sentence is performing morphological analysis on the affirmative sentence or the negative sentence, changing a portion corresponding to a predetermined part of speech into an interrogation, and adding an interrogative final particle to the end of the sentence. For example, when the adjective "text4" is changed to an interrogation for an affirmative sentence "text5" and an interrogative final particle "text6" is added to the end of the sentence, an interrogative sentence "text7" is obtained. In addition, when the noun "text8" is changed to an interrogation for the affirmative sentence and then an interrogative final particle "text6" is added to the end of the sentence, an interrogative sentence "text9" is obtained.

text4: 黄色い, which corresponds to "yellow".

text5: 黄色いヘルメットを装着している, which corresponds to "He/She is wearing a yellow helmet".

text6: か text7: どんなヘルメットを装着しているか, which corresponds to "What helmet he/she is wearing".

text8: ヘルメット, which corresponds to "helmet".

text9: 黄色い何を装着しているか, which corresponds to "What yellow he/she is wearing".

In the above-described example, the adjective "text10" is converted into the interrogation "text11", but the conversion destination may be changed according to the content of the adjective. For example, using ontology or the like, adjective "text10" turns out to represent color. Defining a rule that an adjective representing color such as "text10" is converted into an interrogation "text12", an interrogative sentence "text13" is obtained. In addition, when a rule that "number+ counter suffix" (three pieces or the like) is converted into "text14" is defined, an interrogative sentence "text15" is obtained from a sentence "text16".

text10: 黄色い, which corresponds to "yellow".

text11: どんな, which corresponds to "what".

text12: 何色の, which corresponds to "what color".

text13: 何色のヘルメットを装着しているか, which corresponds to "What color helmet he/she is wearing".

text14: 何 +counter suffix text15: 何人で作業しているか, which corresponds to "How many people are working".

text16: 2 人で作業している, which corresponds to "2 people are working".

In a case where the input query is a keyword, the question acquisition unit 123 specifies a class of the keyword using the dictionary, the ontology and so on, and creates an interrogative sentence from the keyword using a template corresponding to the specified class. In this case, a template is prepared for each class. For example, it is assumed that the class "safety tool" is obtained by tracing the ontology for the keyword "helmet". On the other hand, a rule to use a template "Is he/she wearing (input)" in a case where the class of the keyword is "safety tool" is prepared. As a result, an interrogative sentence "Is he/she wearing a helmet" is obtained from the keyword "helmet". The template may be manually generated, or may be automatically generated based on a keyword extracted from a corpus of interrogative sentences.

As described above, there are a plurality of methods for obtaining a question. Therefore, there may be a plurality of questions obtained by converting the input query.

In the first embodiment, text is used as the query, but the query is not limited to text, and may be an image or audio. In a case where an audio is input as a query, the question acquisition unit 123 may convert the audio into a text by speech recognition and generate a question sentence from the text. In a case where an image is input as a query, the question acquisition unit 123 may generate a caption from the image using the technology of image captioning and generate a question sentence from the caption.

Furthermore, the form that can be handled by the answer estimating unit 125 is not limited to text, and may be audio, image, numerical value (for example, vector), or the like. In a case where the text is input as a query and the form that can be handled by the answer estimating unit 125 is audio, the question acquisition unit 123 may convert the input text into an audio by text-to-speech (TTS). In a case where an audio or an image is input as a query, and the form that can be handled by the answer estimating unit 125 is an audio or an image, the question acquisition unit 123 may use the input audio or image as it is as a question. In a case where text, audio, or an image is input as a query, and the form that can be handled by the answer estimating unit 125 is a vector, the question acquisition unit 123 may convert the input text, audio, or image into a vector by encoding or embedding the input text, audio, or image.

The question acquisition unit 123 sends the converted question to the answer estimating unit 125 and stores the question in the question storage unit 124. The question storage unit 124 stores a question list in which a plurality of questions can be registered. For example, as illustrated in FIG. 2, the question storage unit 124 stores the question acquired by the question acquisition unit 123 in association with the question ID. The question ID is identification information for identifying a question.

When acquiring a question, the question acquisition unit 123 determines whether or not the same question as the acquired question exists in the question storage unit 124. In a case where the same question as the acquired question does not exist in the question storage unit 124, the question acquisition unit 123 adds the acquired question to the question list. Specifically, the question acquisition unit 123 assigns a question ID to the acquired question, and stores the acquired question in association with the assigned question ID in the question storage unit 124. In a case where the same question as the acquired question exists in the question storage unit 124, the question acquisition unit 123 omits addition of the acquired question to the question list. The determination of the sameness of the question sentences may be performed, for example, by calculating the similarity on the characters between the question sentences. For example, the question acquisition unit 123 determines that the question sentences are the same as each other in a case where the calculated similarity exceeds a predetermined threshold, and determines that the question sentences are not the same as each other in a case where the calculated similarity is equal to or less than the predetermined threshold. Furthermore, the determination of the sameness of the question sentences may be performed by encoding or embedding the question sentences to obtain vectors and calculating the similarity between the vectors. In addition, the determination of the sameness of the question sentences may be performed by performing morphological analysis on the question sentences and calculating the similarity between the word obtained from one question sentence and the word obtained from the other question sentence using word2vec or the like.

In a case where the sameness of the question sentences is determined based on the similarity between the vectors, the question storage unit 124 may store a result (vectors) obtained by encoding or embedding the question sentences instead of the question sentences. This eliminates the need for encoding or embedding each time the sameness with the question sentence obtained by the question acquisition unit 123 is determined.

Note that the question storage unit 124 may store not only a question caused by a query input by a single user but also a question caused by a query input by another user. For example, the server 120 provides an image retrieval service to a plurality of clients including the client 110. The question acquisition unit 123 adds a question corresponding to the input query received from the individual client to the question list.

The answer estimating unit 125 receives a question from the question acquisition unit 123. The answer estimating unit 125 estimates an answer to the question for each of the plurality of images stored in the retrieval target storage unit 121 to obtain an answer estimation result. The answer estimation result includes an answer to a question about each image. Typically, the answer estimating unit 125 performs answer estimation using a learned model configured to perform answer estimation based on a question related to an image. The learned model assumed in the present embodiment is a model related to visual question answering (VQA) that derives an answer in a case where an image and a question related to the image are input. Hereinafter, the model related to VQA is also referred to as a VQA model. The learned model is stored in the model storage unit 126.

The answer estimating unit 125 sends the answer estimation result to the grouping unit 128 and stores the answer estimation result in the estimation result storage unit 127. As illustrated in FIG. 3, the estimation result storage unit 127 stores an answer to the question for each image in association with the image ID of the image and the question ID of the question. A record including the image ID, the question ID, and the answer is associated with the answer ID. The answer ID is identification information for identifying a record (in the example illustrated in FIG. 3, a set of an image ID, a question ID, and an answer).

The answer estimating unit 125 may output the certainty factor of the answer together with the answer. In this case, the answer estimation result includes the answer to the question for each image and the certainty factor of the answer. The certainty factor is a metric indicating the certainty of the answer. Further, the answer estimating unit 125 may output a plurality of answers and certainty factors of the respective answers to the question for each image. For example, in a case where a question can be answered as "Yes", "No", or "Uncertain", the answer estimating unit 125 outputs the certainty factor of the answer "Yes", the certainty factor of the answer "No", and the certainty factor of the answer "Uncertain" for each image. In this case, as illustrated in FIG. 4, each record stored in the estimation result storage unit 127 further includes a certainty factor. The information of the certainty factor can be used for grouping in the grouping unit 128 described later and representative image selection in the display control unit 129.

The question storage unit 124 and the estimation result storage unit 127 are used to shorten the time required for answer estimation when the question acquisition unit 123 acquires the same question as a question processed in the past. In a case where the question acquired by the question acquisition unit 123 is the same as the question stored in the question storage unit 124, the answer estimating unit 125 acquires an answer estimation result associated with the question ID of the question from the estimation result storage unit 127. This makes it possible to omit re-execution of answer estimation.

The grouping unit 128 groups the images by using the answer estimation result. Specifically, the grouping unit 128 generates the same number of answer groups as the number of answer types included in the answer estimation result, and classifies the images into these answer groups. For example, if the answer to the question "Is he/she wearing a helmet" is any of "Yes", "No", and "Uncertain", the grouping unit 128 creates a first answer group corresponding to the answer "Yes", a second answer group corresponding to the answer "No", and a third answer group corresponding to the answer "Uncertain", puts an image whose answer is "Yes" into the first answer group, puts an image whose answer is "No" into the second answer group, and puts an image whose answer is "Uncertain" into the third answer group. For example, in a case where the answer estimation result illustrated in FIG. 5 has been obtained, the images 1, 2, and 6 whose answer is "Yes" belong to the first answer group, the images 3 and 5 whose answer is "No" belong to the second answer group, and the image 4 whose answer is "Uncertain" belongs to the third answer group. Here, the image i represents an image whose image ID is i.

Figure 6:
FIG. 6 is a diagram for explaining processing in the grouping unit according to the first embodiment.

In a case where the answer estimating unit 125 outputs a plurality of answers and certainty factors thereof for each image, the grouping unit 128 may perform grouping by using an answer having the highest certainty factor. Furthermore, the grouping unit 128 may put each image into a plurality of answer groups. In this case, in each answer group, the images may be ranked according to the certainty factor. For example, in a case where the answer estimation result illustrated in FIG. 6 has been obtained, each image belongs to both answer groups, and in the answer group of the answer "Yes", the image 1, the image 2, and the image 3 are rearranged in this order, and in the answer group of the answer "No", the image 3, the image 2, and the image 1 are rearranged in this order. The grouping unit 128 may not put an image of which the certainty factor of the answer is less than a predetermined threshold into the answer group corresponding to the answer. For example, assuming that the threshold is 0.2, in the example illustrated in FIG. 6, the image 1 is not included in the answer group of the answer "No".

The display control unit 129 selects a representative image for each answer group, and displays the representative image together with the answer corresponding to the answer group. The representative image is selected from among the images belonging to the answer group. For example, the display control unit 129 may select an image having the smallest image ID as the representative image for each group. In the example illustrated in FIG. 5, the image 1 is selected as the representative image in the answer group of the answer "Yes", the image 3 is selected as the representative image in the answer group of the answer "No", and the image 4 is selected as the representative image in the answer group of the answer "Uncertain". Two or more representative images may be selected for each answer group.

The display control unit 129 generates and outputs a retrieval screen to be displayed to the user. The display control unit 129 generates a retrieval screen indicating a retrieval result including a representative image of each answer group and an answer corresponding to each answer group. For example, the display control unit 129 adds the retrieval result to the retrieval screen.

As described above, in a case where the query is not a question, the question acquisition unit 123 converts the query into a question. In this case, the display control unit 129 may further display a question obtained by converting the query. In addition, in a case of displaying a question, the display control unit 129 may turn off the display of the text input form.

Figure 7:
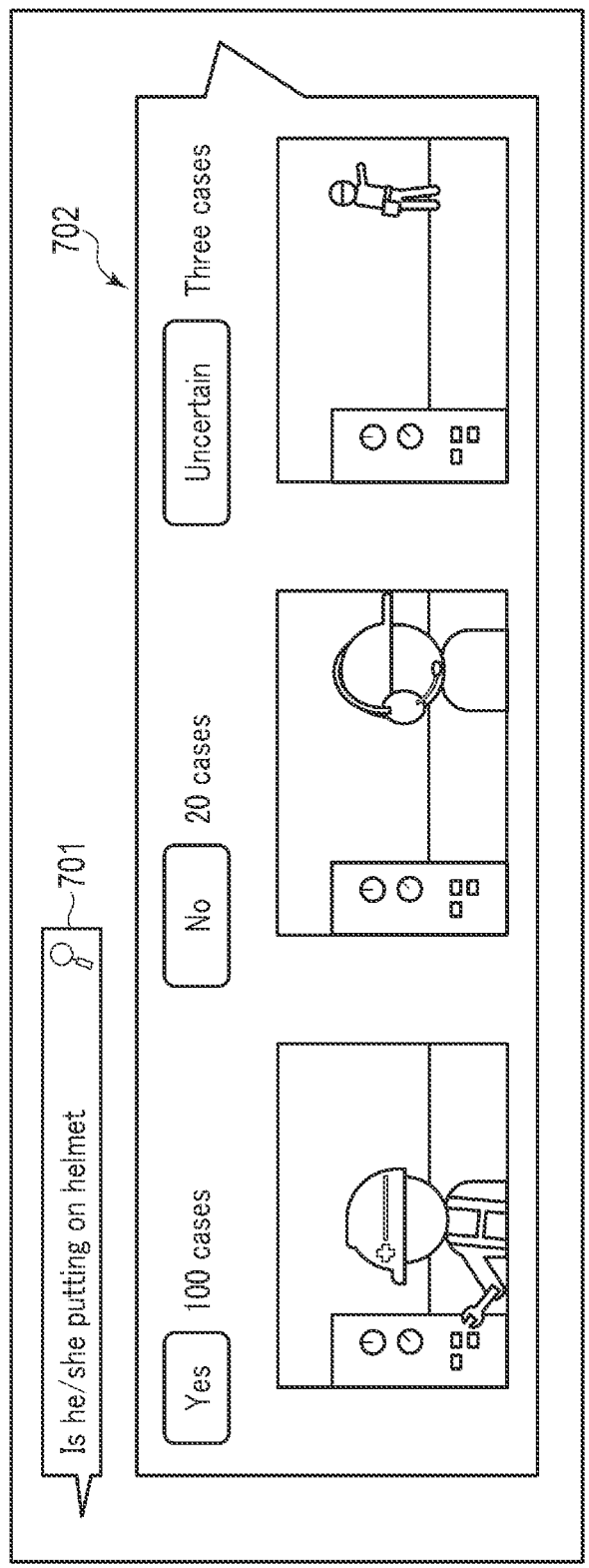
FIG. 7 is a diagram illustrating a retrieval screen according to the first embodiment.
Figure 8:
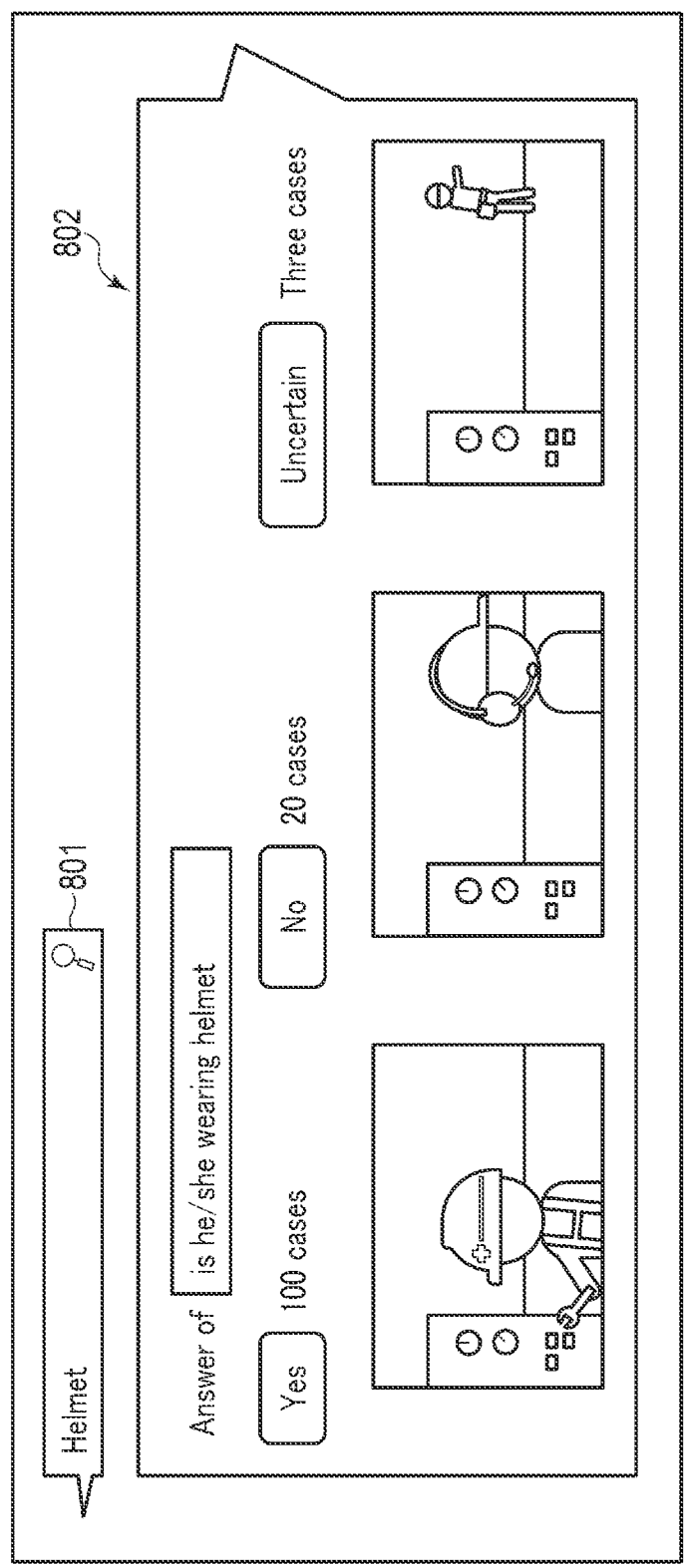
FIG. 8 is a diagram illustrating a retrieval screen according to the first embodiment.

FIG. 7 schematically illustrates a retrieval screen including a retrieval result in a case where the query is an interrogative sentence, and FIG. 8 schematically illustrates a retrieval screen including a retrieval result in a case where the query is a keyword. In FIG. 7, the query (interrogative sentence) input to a text input form 701 and a retrieval result 702 are displayed. In FIG. 8, a query input to a text input form 801 and a retrieval result 802 including a question obtained by converting the query are displayed. Note that, in a case where a question obtained by converting the query is displayed, the display of the text input form 801 may be turned off. In the examples illustrated in FIGS. 7 and 8, the answers, the numbers of images belonging to the answer groups corresponding to the respective answers, and the representative images of the answer groups are displayed as the retrieval results.

Figure 9:
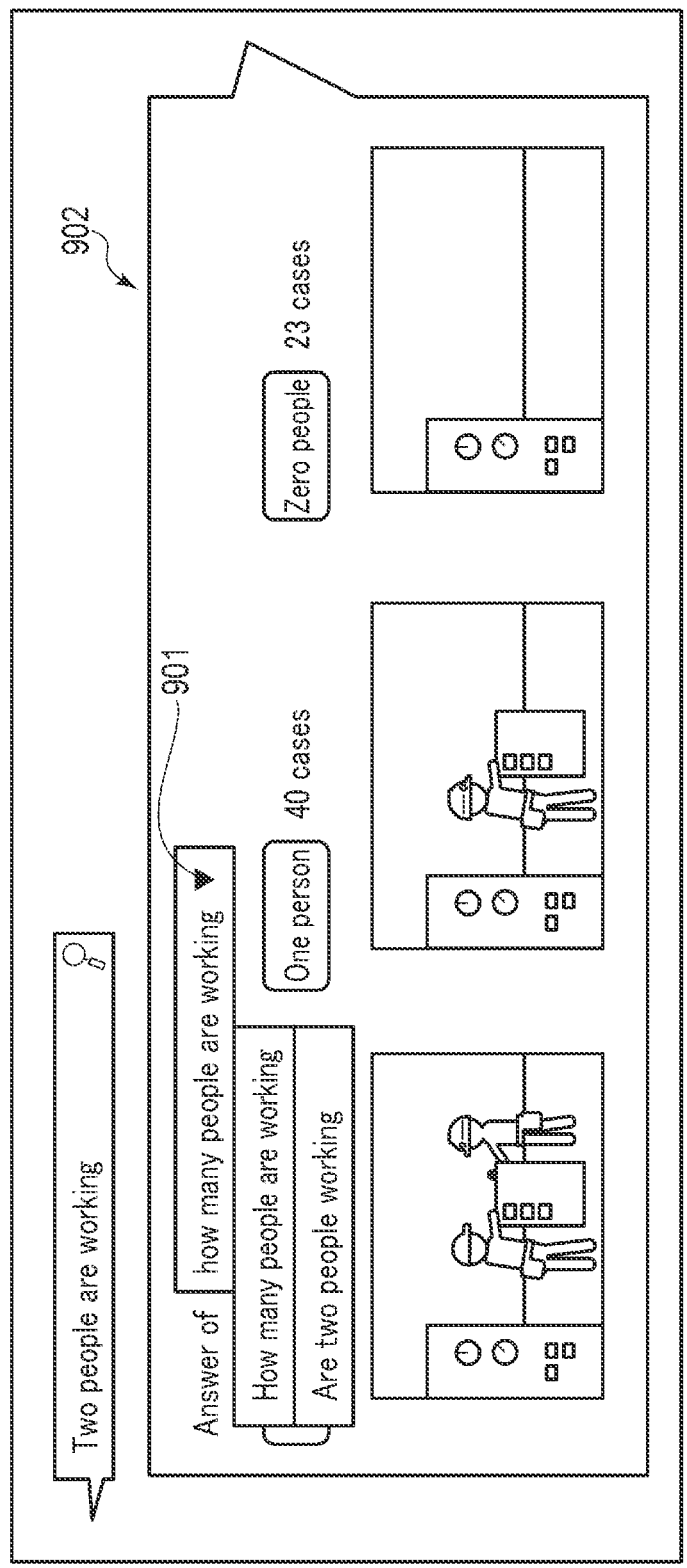
FIG. 9 is a diagram illustrating a retrieval screen according to the first embodiment.

If a plurality of questions is obtained from the query, the retrieval screen may be configured to allow selection of one of the questions. For example, it is assumed that, in a case where a sentence "2 people are working" is input as a query, the question acquisition unit 123 acquires two questions of "How many people are working" and "Are 2 people working". In this case, as illustrated in FIG. 9, the retrieval screen includes a drop-down 901 that enables selection of any of the questions. When the user selects any question in the drop-down 901, a retrieval result 902 corresponding to the selected question is displayed.

Figure 10:
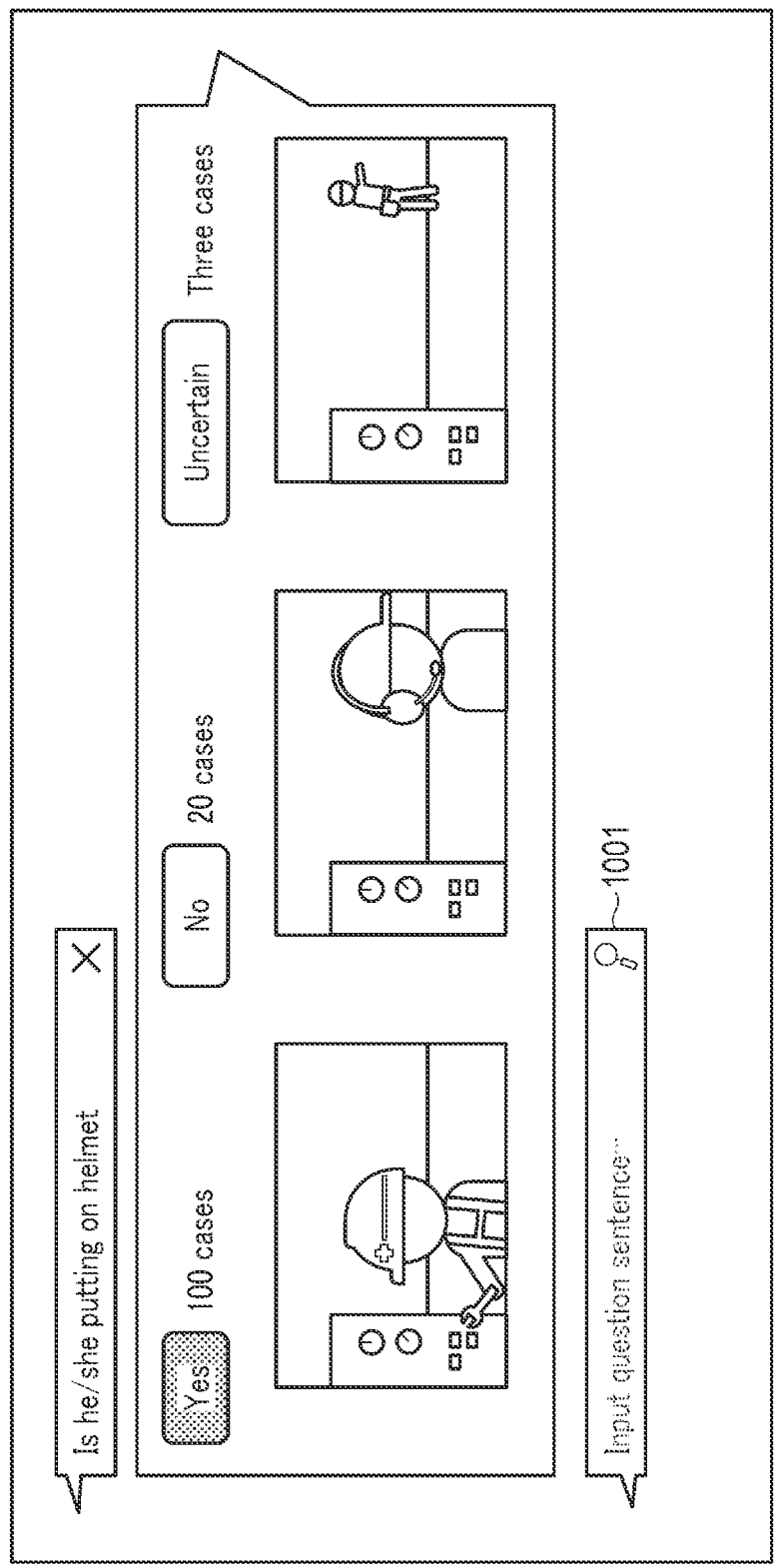
FIG. 10 is a diagram illustrating a retrieval screen according to the first embodiment.

The retrieval screen may be configured to be able to select one of a plurality of answers (that is, a plurality of answer groups) in order to narrow down images. For example, as illustrated in FIG. 10, when the user selects the answer "Yes," an additional text input form 1001 is displayed so that the user can input a further query. In a case where the further query is input to the additional text input form 1001, the answer estimating unit 125 performs answer estimation for the images belonging to the answer group of the answer "Yes", the grouping unit 128 performs grouping based on the answer estimation result obtained by the answer estimating unit 125, and the display control unit 129 displays the retrieval result obtained by the grouping.

The display control unit 129 may be achieved by any method. For example, the display control unit 129 is a response of a web application, and may be implemented on a hypertext markup language (HTML) or JavaScript displayed on a browser of the client 110. Furthermore, in a case where the image retrieval function is implemented in the form of an application on a local computer, the display control unit 129 may be implemented on the source code of the application.

Figure 11:
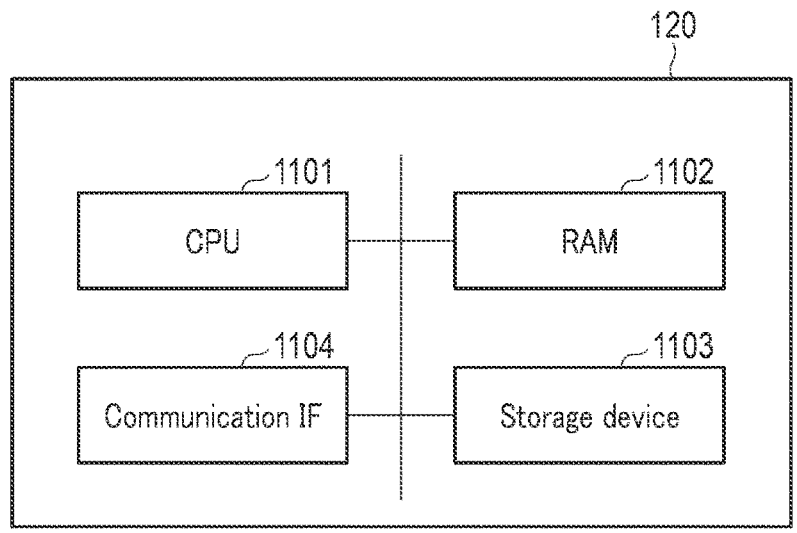
FIG. 11 is a block diagram illustrating a hardware configuration of a server illustrated in FIG. 1.

FIG. 11 schematically illustrates an example of a hardware configuration of the server 120. As illustrated in FIG. 11, the server 120 includes a central processing unit (CPU) 1101, a random access memory (RAM) 1102, a storage device 1103, and a communication interface 1104.

The CPU 1101 is an example of a general-purpose processor capable of executing a program. The CPU 1101 controls the RAM 1102, the storage device 1103, and the communication interface 1104, and performs various types of information processing.

The RAM 1102 includes a volatile memory and is used as a work area of the CPU 1101. The storage device 1103 includes a non-volatile memory such as a hard disk drive (HDD) or a solid state drive (SSD), and stores a program including an information processing program, data, and the like. The CPU 1101 operates according to a program stored in the storage device 1103. For example, when executed by the CPU 1101, the information processing program causes the CPU 1101 to perform processing described with respect to the server 120. Specifically, the CPU 1101 functions as the query input unit 122, the question acquisition unit 123, the answer estimating unit 125, the grouping unit 128, and the display control unit 129 according to the information processing program. The storage device 1103 functions as the retrieval target storage unit 121, the question storage unit 124, the model storage unit 126, and the estimation result storage unit 127.

The communication interface 1104 is an interface for communicating with an external device. The CPU 1101 communicates with the client 110 via the communication interface 1104.

The program such as the image retrieval program may be provided to the server 120 in a state of being stored in a computer-readable recording medium. In this case, the server 120 includes a drive that reads data from a recording medium, and acquires a program from the recording medium. Examples of the recording medium include a magnetic disk, an optical disk (CD-ROM, CD-R, DVD-ROM, DVD-R, or the like), a magneto-optical disk (MO or the like), and a semiconductor memory. In addition, the program may be distributed through a communication network. Specifically, the program may be stored in a server on the communication network, and the server 120 may download the program from the server.

Instead of or in addition to the general-purpose processor, a dedicated processor such as a field programmable gate array (FPGA) or an application specific integrated circuit (ASIC) may be used. The processing circuit refers to a general-purpose processor, a dedicated processor, or a combination of a general-purpose processor and a dedicated processor.

Next, an operation of the server 120 will be described.

Figure 12A:
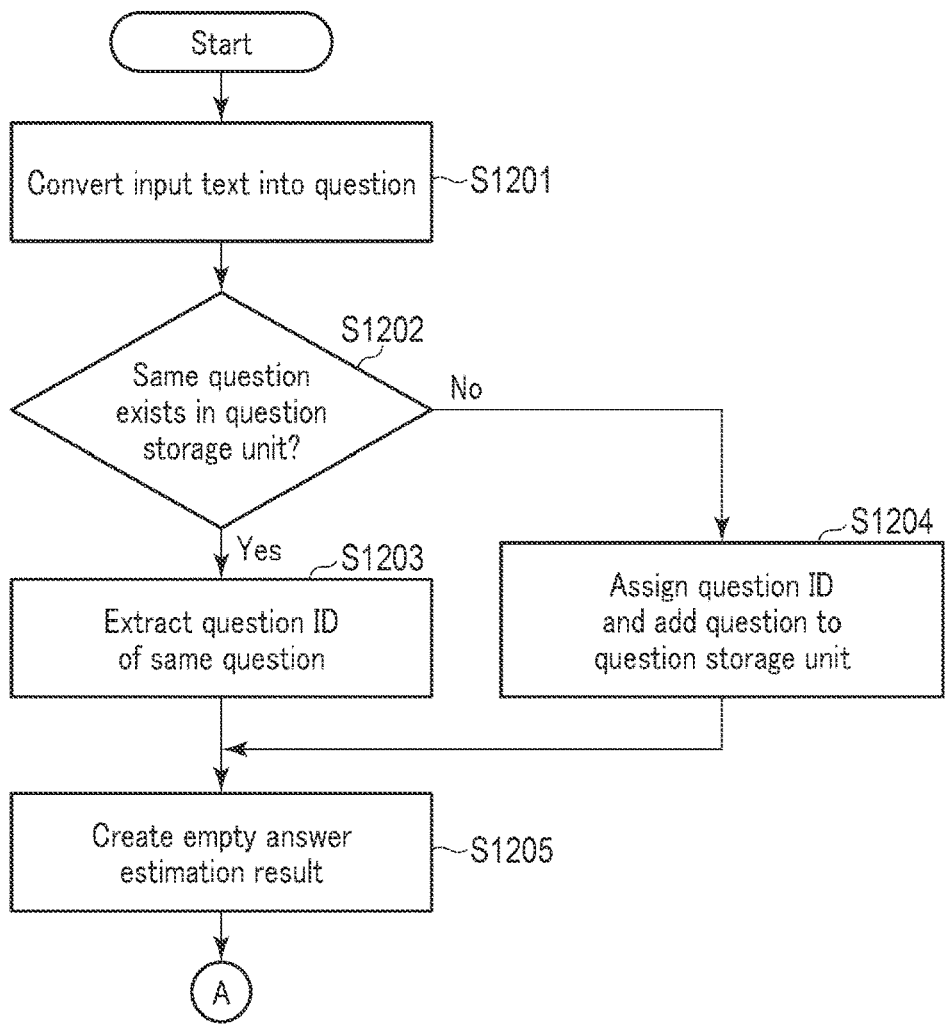
FIG. 12A is a flowchart illustrating an image retrieval method according to the first embodiment.
Figure 12B:
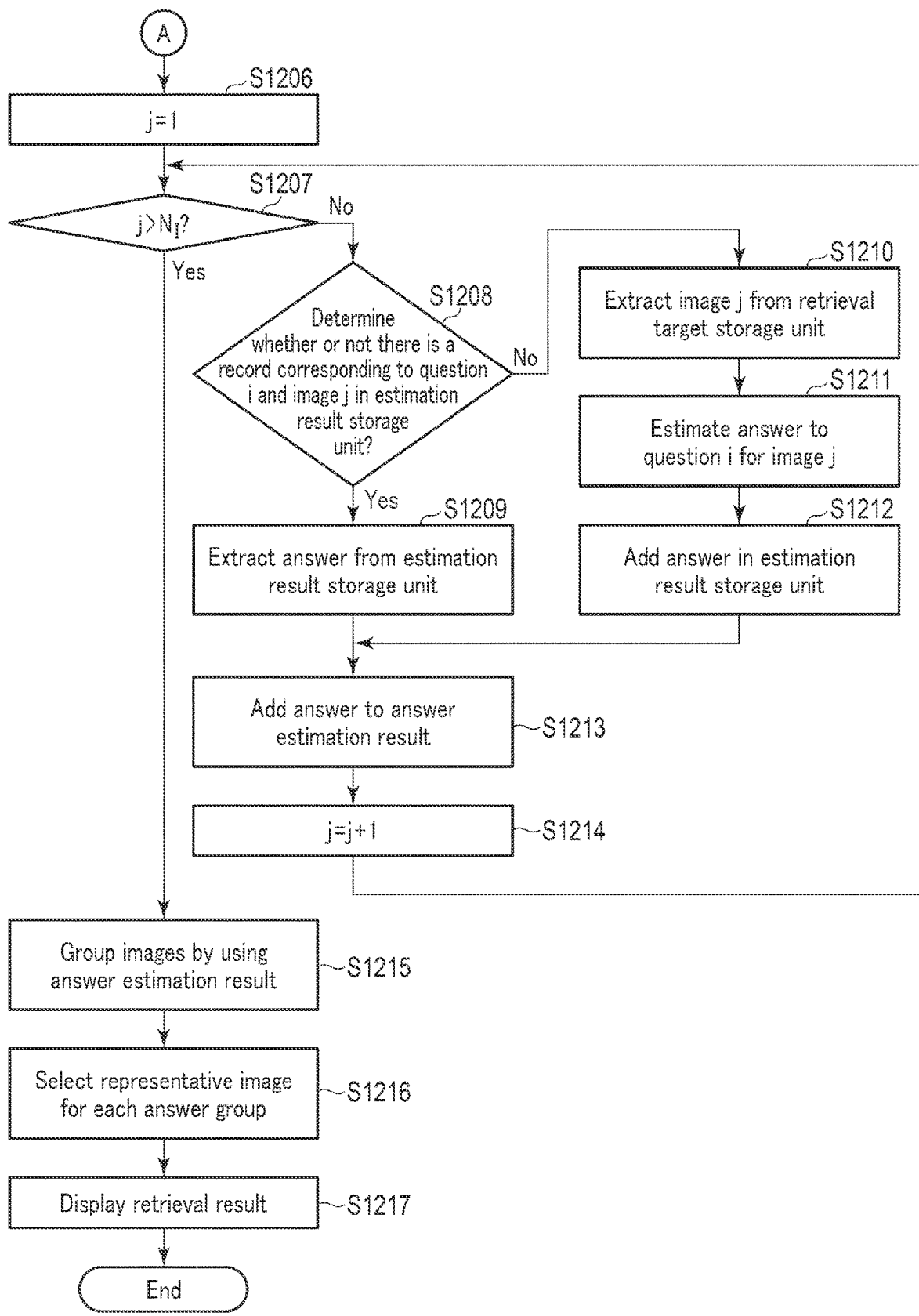
FIG. 12B is a flowchart illustrating the image retrieval method according to the first embodiment.

FIGS. 12A and 12B schematically illustrate a procedure example of the image retrieval method according to the first embodiment. The image retrieval method illustrated in FIGS. 12A and 12B is executed by the server 120.

In step S1201 of FIG. 12A, the question acquisition unit 123 acquires a question corresponding to the query input by the user. For example, the question acquisition unit 123 converts a text input by the user into a question in a text form.

In step S1202, the question acquisition unit 123 determines whether or not the same question as the question obtained in step S1201 exists in the question storage unit 124.

In a case where the same question as the question obtained in step S1201 exists in the question storage unit 124 (step S1202; Yes), the flow proceeds to step S1203. In step S1203, the question acquisition unit 123 extracts a question ID of the same question as the question obtained in step S1201 from the question storage unit 124, and notifies the answer estimating unit 125 of the extracted question ID and the question obtained in step S1201.

On the other hand, in a case where the same question as the question obtained in step S1201 does not exist in the question storage unit 124 (step S1202; No), the flow proceeds to step S1204. In step S1204, the question acquisition unit 123 assigns a question ID to the question obtained in step S1201, and stores the question obtained in step S1201 in the question storage unit 124 in association with the assigned question ID. Furthermore, the question acquisition unit 123 notifies the answer estimating unit 125 of the assigned question ID and the question obtained in step S1201.

Here, the question ID extracted in step S1203 or the question ID assigned to the question in step S1204 is i. Hereinafter, a question whose question ID is i will be described as a question i.

For example, when the user inputs a query "helmet" for the first time, the question acquisition unit 123 converts the input query to obtain a question "Is he/she wearing a helmet". Since no question is initially stored in the question storage unit 124, the question acquisition unit 123 newly generates a question ID=1 and stores the question in the question storage unit 124 in association with the question ID=1.

Thereafter, it is assumed that another user or the same user inputs a query "Putting on a helmet". The question acquisition unit 123 converts the input query to obtain two questions "Is he/she wearing a helmet" and "Is he/she putting on a helmet". The question acquisition unit 123 individually checks whether or not the same question as the two questions exists in the question storage unit 124. Since the question storage unit 124 stores a question sentence "Is he/she wearing a helmet", the question acquisition unit 123 determines that the same question as the two questions exists in the question storage unit 124. The question acquisition unit 123 sets the question ID=1 of the question "Is he/she wearing a helmet" in the question storage unit 124 as a question ID to be used in subsequent processing.

When the flow proceeds from step S1203 or step S1204 to step S1205, the answer estimating unit 125 creates an empty answer estimation result. For example, the answer estimating unit 125 creates an answer estimation result including an image ID but not including an answer as illustrated in the left part of FIG. 13. Thereafter, the flow proceeds to step S1206 in FIG. 12B.

In step S1206 of FIG. 12B, the answer estimating unit 125 sets the variable j to 1.

In step S1207, the answer estimating unit 125 determines whether or not the variable j is larger than $N_I$. The variable j being larger than $N_I$ indicates that the answer estimation result includes the answers for all of the $N_I$ images.

In a case where the variable j is less than or equal to $N_I$ (step S1207; No), the flow proceeds to step S1208. In step S1208, the answer estimating unit 125 determines whether or not there is a record in which the question ID is equal to i and the image ID is equal to j in the estimation result storage unit 127. In a case where there is a record in which the question ID is equal to i and the image ID is equal to j (step S1208; Yes), the flow proceeds to step S1209, and in a case where there is no record in which the question ID is equal to i and the image ID is equal to j (step S1208; No), the flow proceeds to step S1210.

In a case where the flow proceeds from step S1208 to step S1209, the answer estimating unit 125 extracts an answer from the estimation result storage unit 127 from the record in which the question ID is equal to i and the image ID is equal to j. Thereafter, in step S1213, the answer estimating unit 125 adds the extracted answer to the answer estimation result as an answer for the image j.

In a case where the flow proceeds from step S1208 to step S1210, the answer estimating unit 125 extracts the image j from the retrieval target storage unit 121. In step S1211, the answer estimating unit 125 estimates an answer to the question i for the image j. For example, the answer estimating unit 125 inputs the image j and the question i to the VQA model, and obtains an answer output from the VQA model. In step S1212, the answer estimating unit 125 stores the estimated answer in the estimation result storage unit 127 in association with the image ID and the question ID. Thereafter, in step S1213, the answer estimating unit 125 adds the estimated answer to the answer estimation result as an answer for the image j.

After the processing illustrated in step S1213 ends, the flow proceeds to step S1214, and the answer estimating unit 125 increases the variable j by 1. Thereafter, the flow returns to step S1207. A series of processing illustrated in steps S1207 to S1214 is repeated until the variable i exceeds $N_I$. Thereby, as illustrated in the right part of FIG. 13, the answer estimation result includes answers for all the $N_I$ images.

In a case where the variable j is larger than $N_I$ (step S1207; Yes), the flow proceeds to step S1215. In step S1215, the grouping unit 128 groups the $N_I$ images by using the answer estimation result. For example, the grouping unit 128 creates a number of groups equal to the number of answer types included in the answer estimation result, and puts each image into the group corresponding to the answer for the image.

In step S1216, the display control unit 129 selects a representative image from among the images belonging to the group for each answer group, and displays a retrieval result in which the answer is associated with the representative image of the answer group.

As described above, in the first embodiment, the server 120 receives the query input by the user, acquires the question corresponding to the received query, estimates the answer to the question for each of the plurality of images to generate the answer estimation result, classifies the plurality of images into the plurality of answer groups using the answer estimation result, and generates the retrieval result indicating the images belonging to each of the plurality of answer groups. In this manner, the server 120 treats the input query as a viewpoint for retrieving an image. This allows the user to easily search for a desired image. As a result, it is possible to reduce the time and effort required for the user to reach a desired image. For example, in a case where the user inputs the keyword "helmet", not only an image matching the sentence "He/she is wearing a helmet" but also an image not matching the sentence "He/she is wearing a helmet" are presented to the user.

Second Embodiment

A second embodiment relates to scene retrieval for retrieving a desired scene from a moving image. In the first embodiment, the retrieval target is still images, but in the second embodiment, the retrieval target is a moving image. The second embodiment corresponds to a case where a plurality of images in the first embodiment is a plurality of frame images (also simply referred to as frames) included in a moving image. A moving image refers to a sequence of images accompanied by information indicating time or order, such as a video, an animation, or a set of still images captured sequentially at predetermined time intervals. Also in the second embodiment, with reference to the information processing system 100 illustrated in FIG. 1, points different from the first embodiment will be mainly described, and description of points similar to the first embodiment will be appropriately omitted.

A server 120 implements a moving image scene retrieval function of retrieving a desired scene from a moving image, and provides a moving image scene retrieval service to a client 110. In an example, the moving image scene retrieval function is implemented in the server 120 as a web application, and the client 110 accesses the moving image scene retrieval service by using a web browser. When the client 110 accesses the moving image scene retrieval service, a retrieval screen including a moving image selection form for selecting a moving image and a text input form for inputting a query in a text form is displayed on the web browser. The user selects a moving image to be retrieved in the moving image selection form, and inputs a query to the text input form. The server 120 receives information indicating the moving image selected by the user and the input query from the client 110, performs moving image scene retrieval for the moving image indicated by the received information using the input query indicated by the received information, and obtains a moving image scene retrieval result. The server 120 adds the moving image scene retrieval result to the retrieval screen, thereby presenting the moving image scene retrieval result to the user through the client 110.

A retrieval target storage unit 121 stores a plurality of moving images in association with moving image IDs. The moving image ID is identification information for identifying a moving image.

Figure 14:
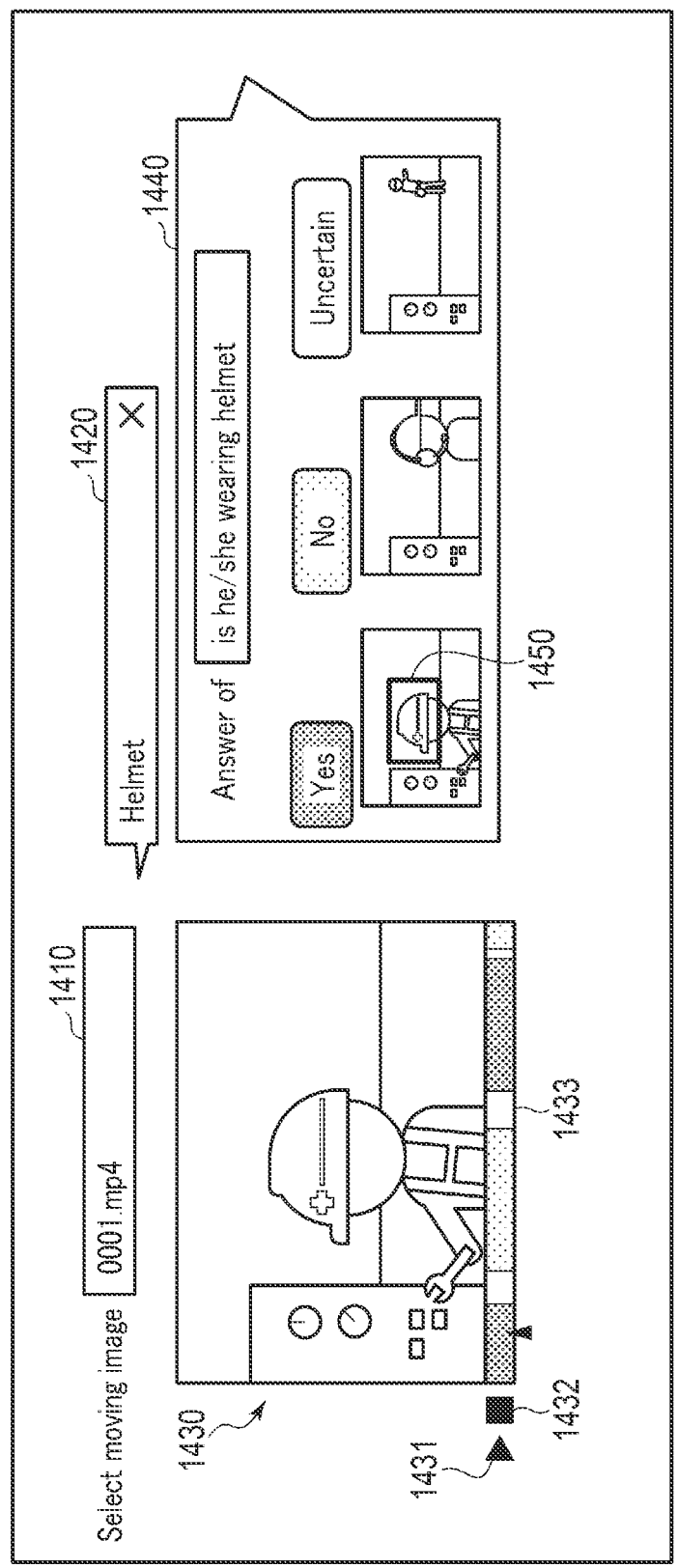
FIG. 14 is a diagram illustrating a retrieval screen generated by a display control unit according to the second embodiment.

A query input unit 122 is a user interface that enables moving image selection and query input. For example, as illustrated in FIG. 14, the query input unit 122 is a combination of a moving image selection form 1410 for selecting a moving image and a text input form 1420 for inputting a query in a text form. The moving image selection form 1410 may be configured to select a moving image in a drop-down. Furthermore, in a case where the retrieval target storage unit 121 is provided in an external device, the moving image selection form 1410 may be configured to display a dialog for selecting a moving image file when clicked by the user. In addition to the moving image selection form 1410 and the text input form 1420, the retrieval screen includes a moving image display area 1430 for displaying the moving image selected by the user and a retrieval result display area 1440 for displaying the retrieval result. The moving image display area 1430 includes a reproduction button 1431, a stop button 1432, and a seek bar 1433.

Figures 15, 16:
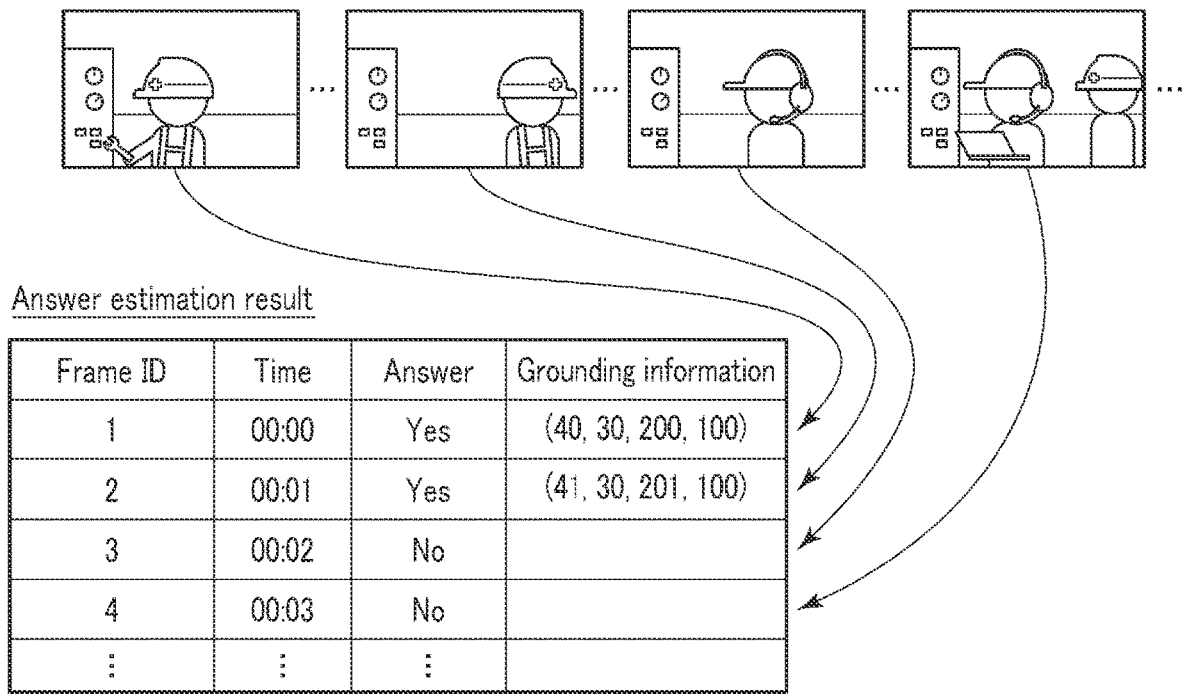
FIG. 15 is a diagram illustrating an answer estimation result according to the second embodiment.
FIG. 16 is a diagram illustrating information stored in an estimation result storage unit according to the second embodiment.

The answer estimating unit 125 receives a question from the question acquisition unit 123. The answer estimating unit 125 estimates an answer to the question for each of a plurality of frames included in the moving image selected by the user, and obtains an answer estimation result. As illustrated in FIG. 15, the answer estimation result indicates an answer to the question for each of the plurality of frames. In FIG. 15, a frame ID is identification information for identifying a frame. The target for which answer estimation is performed may be all the frames forming the moving image, or may be a plurality of frames extracted from the moving image by sampling. In the example illustrated in FIG. 15, the sampling rate is 1 frame per second.

The answer estimating unit 125 may perform answer estimation using the VQA model. In the second embodiment, the VQA model is configured to receive an image and a question as inputs, and output an answer and grounding information indicating a position on an image serving as a grounding of the answer. The grounding information is also called visual grounding. The grounding information may be area information indicating a rectangular area on an image such as a rectangle 1450 illustrated in FIG. 14. For example, the grounding information includes coordinates of an upper left position of the rectangular area, and a width and a height of the rectangular area. Alternatively, the grounding information may include a score value of each pixel of the image, or may include an image in which the score value is displayed in a heat map. The grounding information may be output for all the answers. The presence or absence of the output of the grounding information may be switched according to the type of answer. For example, the grounding information may be output in a case where the answer is "Yes", and may not be output in a case where the answer is "No". Note that, as described in the first embodiment, the answer estimating unit 125 may output the certainty factor of each answer.

The answer estimating unit 125 stores an answer estimation result including an answer to the question for each frame in the estimation result storage unit 127. In the estimation result storage unit 127, as illustrated in FIG. 16, each record includes an answer ID, a moving image ID, time information, a question ID, an answer, and grounding information. The moving image ID is identification information for identifying a moving image. The time information indicates a timestamp on the moving image. The record may further include a frame ID. The frame ID corresponds to a timestamp on the moving image on a one-to-one basis. In the example illustrated in FIG. 16, the grounding information is information for specifying a rectangular area on the image. In the notations (x, y, width, height), x and y represent the coordinates of the upper left position of the rectangular area, and width and height represent the width and height of the rectangular area. In a case where the grounding information is the score map, the estimation result storage unit 127 may store the score map itself. In a case where the grounding information is a heat map image having a score, the estimation result storage unit 127 may store a heat map image encoded with BASE 64 or the like.

The display control unit 129 selects a representative image for each answer group, and displays the answer corresponding to the answer group together with the representative image in association with the time of the moving image.

The display control unit 129 may select the representative image using the time information. In each group, one or a plurality of frame sets, each of which is a set of continuous frames, exist. The fact that the time length of the frame set is long indicates that a situation matching the answer is stably displayed on the moving image. The display control unit 129 selects a frame set having the longest time length from the frame sets, and selects a frame having a median time in the selected frame set as a representative image.

Alternatively, the display control unit 129 may select the representative image using the grounding information. For example, in a case where the grounding information is information for specifying a rectangular area in a frame, the display control unit 129 may select a frame having the largest area of the rectangular area as the representative image.

Alternatively, the display control unit 129 may select the representative image by using a combination of the time information and the grounding information. For example, the display control unit 129 calculates the score for each frame using the time information and the grounding information, and selects the frame having the highest score as the representative image. When the time length of the frame set including the frames is L, the size (area) of the rectangular area indicated by the frame grounding information is S, and the score is s, the score s can be expressed by, for example, the following formula.

$$s = a \times L + b \times S$$

Here, a and b are predetermined constants.

Alternatively, the display control unit 129 may select a representative image by a method similar to that described with respect to the first embodiment. For example, the display control unit 129 may select the first frame as the representative image, or may select the frame having the highest certainty factor as the representative image.

As illustrated in FIG. 14, the display control unit 129 colors a portion of the corresponding time in the same color as the color used to display the answer group on the seek bar 1433.

The answer estimation may not be stable, and the answers of some frames may vary against surrounding frames. For example, assuming that the sampling interval is 0.5 seconds, it may happen that an answer "Yes" is obtained for frames of from 0.0 to 5.0 seconds, an answer "No" is obtained for a frame of 5.5 seconds, and an answer "Yes" is obtained for frames of from 6.0 to 10.0 seconds. In a case where the answer is different for such a frame of a short period, it is considered that there is a possibility of an estimation error of the VQA model.

In order to correct the estimation error as described above, the answer estimating unit 125 may smooth the answer included in the answer estimation result. Specifically, the answer estimating unit 125 specifies the answer of the type having the largest number among the answers for the N consecutive frames and sets the specified answer as the answer for the center frame, while shifting by one frame. For example, when N is set to 7 and the above-described example is referred again, first, the answer estimating unit 125 first confirms answers for 7 frames of from 0.0 to 3.0 seconds. Since all the 7 answers are "Yes", the answer estimating unit 125 keeps the answer for the 1.5 seconds frame "Yes". Next, the answer estimating unit 125 checks answers for 7 frames of from 0.5 to 3.5 seconds. Since all the 7 answers are "Yes", the answer estimating unit 125 keeps the answer for the 2.0 seconds frame "Yes". Similarly, the answer estimating unit 125 keeps the answers for the 2.5 to 5.0 seconds frames "Yes". Subsequently, the answer estimating unit 125 confirms answers for 7 frames of from 4.0 to 7.0 seconds. Since there are 6 "Yes" answers, and there is 1 "No" answer, the answer estimating unit 125 corrects the answer for the 5.5 seconds frame from "No" to "Yes".

The above-described smoothing method is an example, and any smoothing method may be used.

The answer estimation result includes the answer and the grounding information. The display control unit 129 may display the grounding information together when displaying the representative image. For example, in a case where the grounding information indicates a rectangular area, as illustrated in FIG. 14, the display control unit 129 displays the rectangle specified by the grounding information in a superimposed manner on the representative image. In a case where the grounding information indicates the score values for the respective pixels, the display control unit 129 may convert the scores into a heat map image and display the heat map image in a superimposed manner on the representative image. In a case where the grounding information is the heat map image, the display control unit 129 may display the heat map image as it is in a superimposed manner on the representative image. Alternatively, the display control unit 129 may display the grounding information in response to a mouse hover on the representative image. Furthermore, the display control unit 129 may also display the grounding information in a superimposed manner on the moving image body.

FIG. 17 schematically illustrates an example of the retrieval screen in a case where one of the answer groups is selected. Specifically, FIG. 17 illustrates a state where the user has selected the answer group of the answer "Yes" on the retrieval screen illustrated in FIG. 14. As illustrated in FIG. 17, the display control unit 129 display the representation on the seek bar corresponding to the selected answer group, and doesn't display the representation on the seek bar corresponding to the answer group other than the selected answer group. Furthermore, the display control unit 129 displays an additional text input form 1810 so that the user can input a further query. When a further query is input, the answer estimating unit 125 performs answer estimation for frames belonging to the answer group of the answer "Yes", and the grouping unit 128 performs grouping based on the answer estimation result obtained by the answer estimating unit 125.

Next, an operation of the server 120 will be described.

It takes time to perform processing of estimating answers to questions for all frames obtained by sampling a moving image. Therefore, when a moving image is added to the retrieval target storage unit 121, the server 120 may perform processing of estimating an answer to each question stored in the question storage unit 124 for this moving image in the background. As a result, when the same question as the question stored in the question storage unit 124 is input, a retrieval result can be obtained in a short time.

Figure 18:
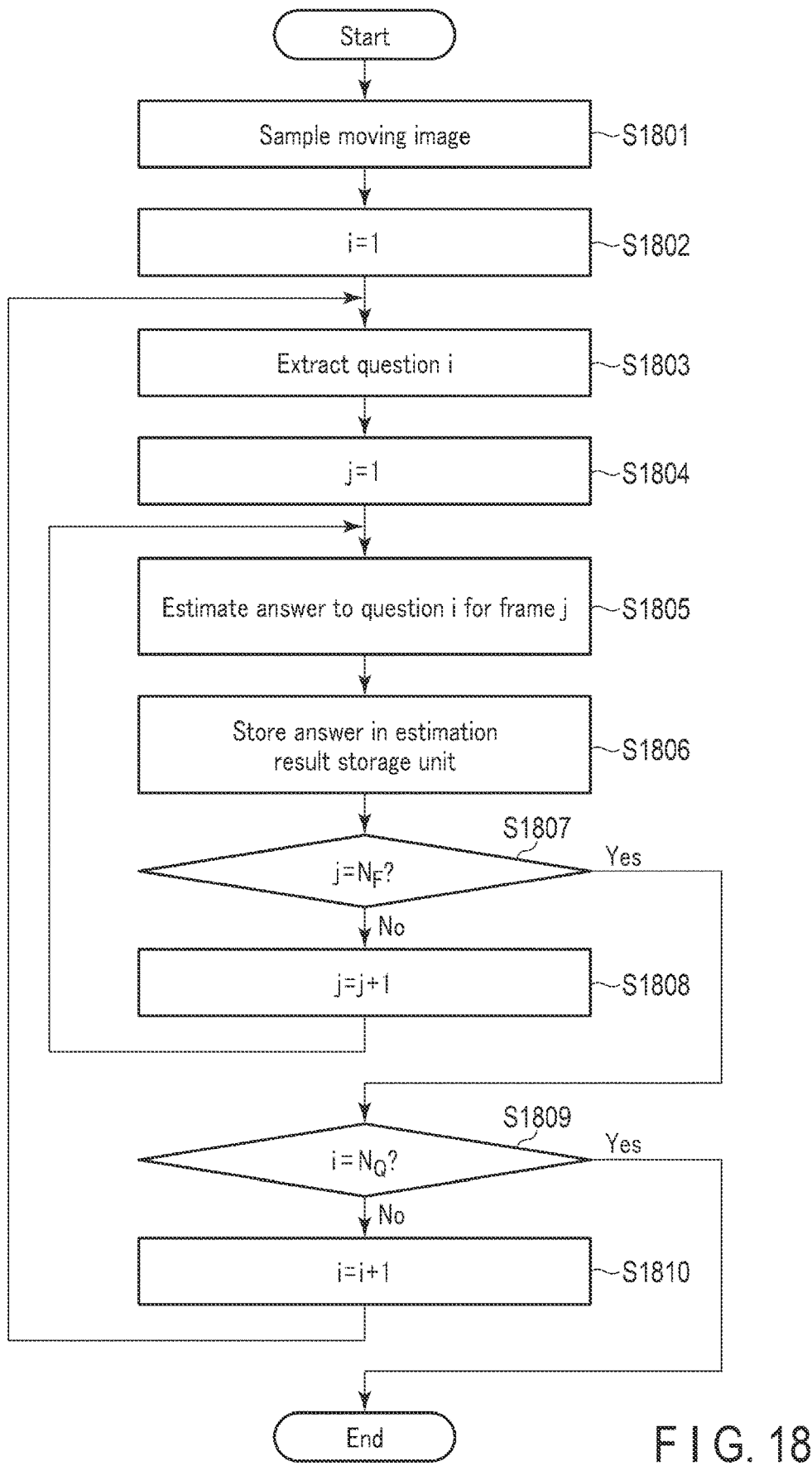
FIG. 18 is a flowchart illustrating a moving image addition method according to the second embodiment.

FIG. 18 schematically illustrates a procedure example of a moving image addition method executed when a moving image is added to the retrieval target storage unit 121 according to the present embodiment. The moving image addition method illustrated in FIG. 18 is executed by the server 120. Here, it is assumed that $N_Q$ questions with question IDs of 1 to $N_Q$ are stored in the question storage unit 124.

In step S1801, the answer estimating unit 125 extracts the added moving image from the retrieval target storage unit 121, samples the extracted moving image to obtain frames, and assigns a frame ID to each frame. Here, it is assumed that $N_F$ frames having frame IDs of 1 to $N_F$ are obtained.

In step S1802, the answer estimating unit 125 sets the variable i to 1.

In step S1803, the answer estimating unit 125 extracts a question i (a question whose question ID is i) from the question storage unit 124.

In step S1804, the answer estimating unit 125 sets the variable j to 1.

In step S1805, the answer estimating unit 125 estimates an answer to the question i for the frame j (a frame whose frame ID is j). For example, the answer estimating unit 125 inputs the frame j and the question i to the VQA model, and obtains an answer output from the VQA model in response to the input of the frame j and the question i.

In step S1806, the answer estimating unit 125 stores the answer obtained in step S1805 in the estimation result storage unit 127 in association with the question ID=i and the frame ID=j.

In step S1807, the answer estimating unit 125 determines whether or not the variable j is equal to $N_F$. The variable j being equal to $N_F$ refers to that the answer estimation for the question i has been completed for all of the $N_F$ frames.

In a case where the variable j is less than $N_F$ (step S1807; No), the flow proceeds to step S1808. In step S1808, the answer estimating unit 125 increases the variable j by 1. Thereafter, the flow returns to step S1805.

In a case where the variable j is equal to $N_F$ (step S1807; Yes), the flow proceeds to step S1809. In step S1909, the answer estimating unit 125 determines whether or not the variable i is equal to $N_Q$. The variable i being equal to $N_Q$ refers to that the answer estimation is completed for all the $N_Q$ questions.

In a case where the variable i is less than $N_Q$ (step S1809; No), the flow proceeds to step S1810. In step S1810, the answer estimating unit 125 increases the variable i by 1. Thereafter, the flow returns to step S1803.

In a case where the variable i is equal to $N_Q$ (step S1809; Yes), the flow ends.

Figure 19A:
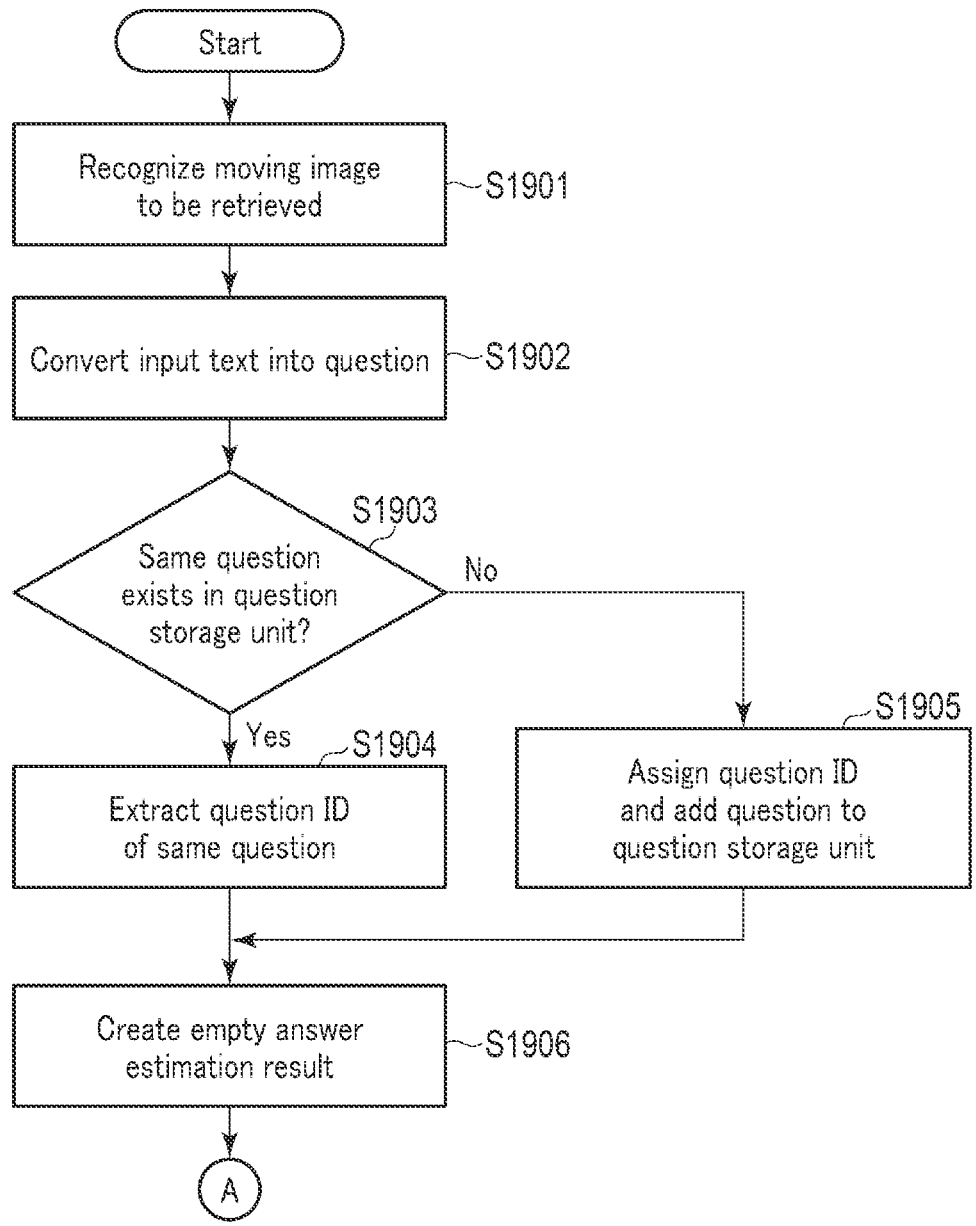
FIG. 19A is a flowchart illustrating a moving image scene retrieval method according to the second embodiment.
Figure 19B:
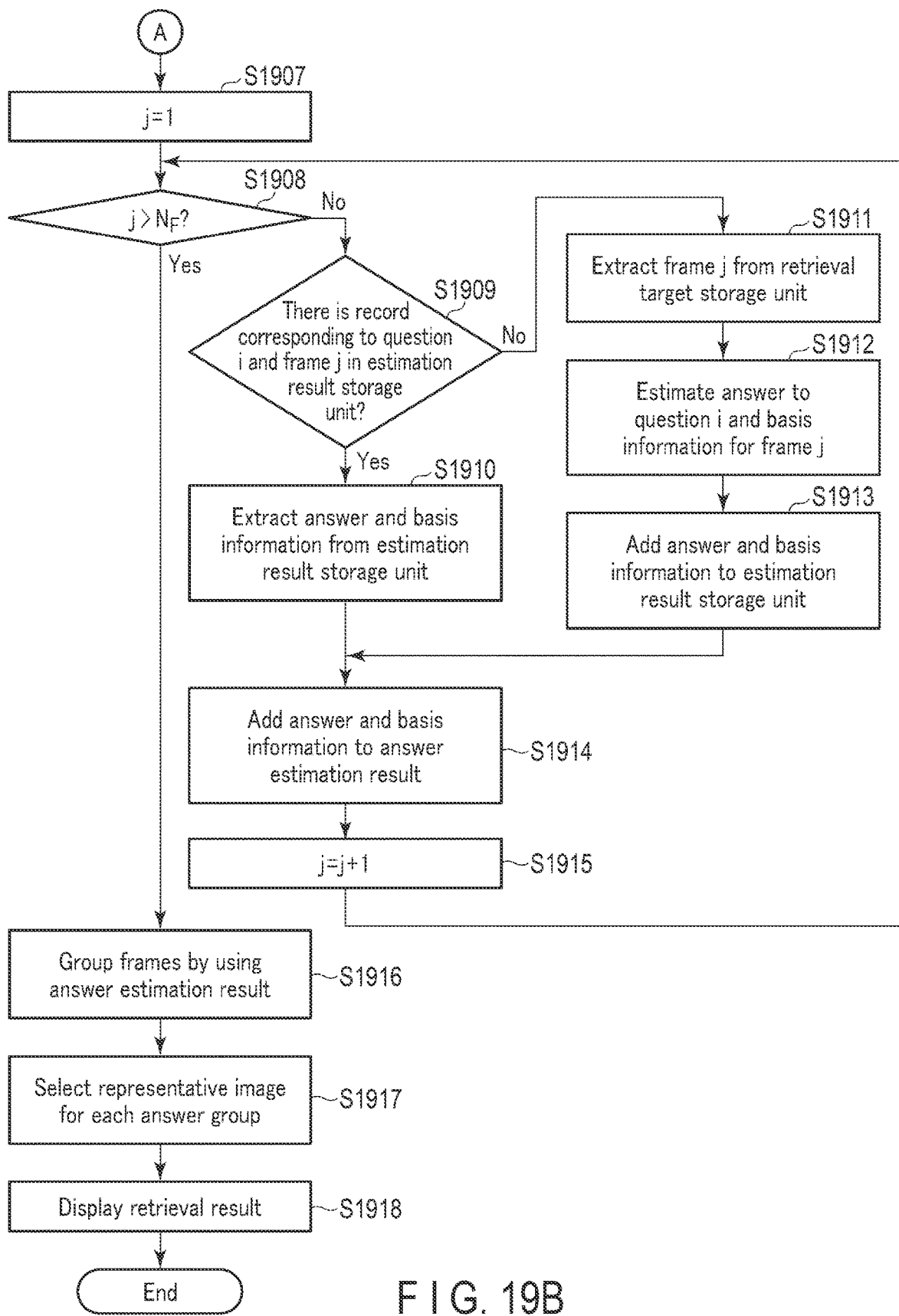
FIG. 19B is a flowchart illustrating a moving image scene retrieval method according to the second embodiment.

FIGS. 19A and 19B schematically illustrate a procedure example of the moving image scene retrieval method according to the present embodiment. The moving image scene retrieval method illustrated in FIGS. 19A and 19B is executed by the server 120. The flow illustrated in FIGS. 19A and 19B is similar to the flow illustrated in FIGS. 12A and 12B, but there is a difference in details due to a difference in the retrieval target.

In step S1901 of FIG. 19A, the answer estimating unit 125 acquires information indicating the moving image selected by the user. The answer estimating unit 125 calculates the number $N_F$ of frames obtained by sampling the moving image from the time length of the moving image selected by the user. Here, it is assumed that $N_F$ frames are obtained by sampling the moving image, and frame IDs of 1 to $N_F$ are assigned to these frames.

In step S1902, the question acquisition unit 123 converts the query input by the user into a question in a text form. In step S1903, the question acquisition unit 123 determines whether or not the same question as the question obtained in step S1902 exists in the question storage unit 124.

In a case where the same question as the question obtained in step S1902 exists in the question storage unit 124 (step S1903; Yes), the flow proceeds to step S1904. In step S1904, the question acquisition unit 123 extracts a question ID of the same question as the question obtained in step S1902 from the question storage unit 124, and sends the extracted question ID and the question obtained in step S1902 to the answer estimating unit 125.

On the other hand, in a case where the same question as the question obtained in step S1902 does not exist in the question storage unit 124 (step S1903; No), the flow proceeds to step S1905. In step S1905, the question acquisition unit 123 assigns a question ID to the question obtained in step S1905, and stores the question obtained in step S1902 in the question storage unit 124 in association with the assigned question ID. Furthermore, the question acquisition unit 123 sends the assigned question ID and the question obtained in step S1902 to the answer estimating unit 125.

Here, the question ID extracted in step S1904 or the question ID assigned to the question in step S1905 is i.

When the flow proceeds from step S1904 or step S1905 to step S1906, the answer estimating unit 125 creates an empty answer estimation result. For example, the answer estimating unit 125 creates an answer estimation result including a frame ID and time information but does not include an answer. Note that since the frame ID corresponds to the timestamp indicated by the time information on a one-to-one basis, the answer estimation result may not include the frame ID. Thereafter, the flow proceeds to step S1907 in FIG. 19B.

In step S1907 of FIG. 19B, the answer estimating unit 125 sets the variable j to 1. In a case where the variable j is not larger than $N_F$ (step S1908; No), the flow proceeds to step S1909.

In a case where there is a record in which the question ID is equal to i and the frame ID is equal to j in the estimation result storage unit 127 (step S1909; Yes), the flow proceeds to step S1910, and the answer estimating unit 125 extracts the answer and the grounding information included in the record in which the question ID is equal to i and the frame ID is equal to j from the estimation result storage unit 127. Thereafter, in step S1912, the answer estimating unit 125 adds the extracted answer and grounding information to the answer estimation result.

In a case where there is no record in which the question ID is equal to i and the frame ID is equal to j in the estimation result storage unit 127 (step S1909; No), the flow proceeds to step S1911, and the answer estimating unit 125 extracts a frame j (a frame whose frame ID equal to j) from the retrieval target storage unit 121. In step S1912, the answer estimating unit 125 estimates the answer to the question i and the grounding information for the frame j. For example, the answer estimating unit 125 inputs the frame j and the question i to the VQA model, and obtains the answer and the grounding information output from the VQA model.

In step S1913, the answer estimating unit 125 stores the estimated answer and grounding information in the estimation result storage unit 127 in association with the moving image ID, the frame ID, and the question ID. Thereafter, in step S1914, the answer estimating unit 125 adds the estimated answer and grounding information to the answer estimation result.

When the processing illustrated in step S1914 ends, the flow proceeds to step S1915, and the answer estimating unit 125 increases the variable j by 1. Thereafter, the flow returns to step S1908. A series of processing illustrated in steps S1908 to S1915 is repeated until the variable i exceeds $N_F$. As a result, the answer estimation result includes answers for all the $N_F$ frames.

In a case where the variable j is larger than $N_F$ (step S1908; Yes), the flow proceeds to step S1916. In step S1916, the grouping unit 128 groups the $N_F$ frames by using the answer estimation result. For example, the grouping unit 128 creates a number of groups equal to the number of answer types included in the answer estimation result, and puts each image into a group corresponding to the answer for the image.

In step S1917, the display control unit 129 selects a representative image for each group. In step S1918, the display control unit 129 displays the retrieval result.

As described above, in the second embodiment, an answer to a question based on an input query is displayed in association with time information of a moving image, and information serving as an answer grounding is displayed in a superimposed manner. This allows the user to easily grasp where the desired scene is and how it is distributed.

Third Embodiment

In the first and second embodiments, the user inputs a query each time. It takes time to consider the query, and it is not always possible for a user to input an appropriate query for an image group or a moving image to be retrieved. In addition, since it takes time to estimate an answer, inputting an unnecessary query would result in outputting a meaningless retrieval result and taking unnecessary time.

An information processing apparatus according to a third embodiment holds a question list including a plurality of questions and estimates an answer to each question included in the question list in advance. When presenting a retrieval result for a query input by the user, the information processing apparatus selects a question useful for filtering for the retrieval result from the question list and proposes the selected question to the user. As a result, it is possible to perform retrieval interactively and efficiently.

Figure 20:
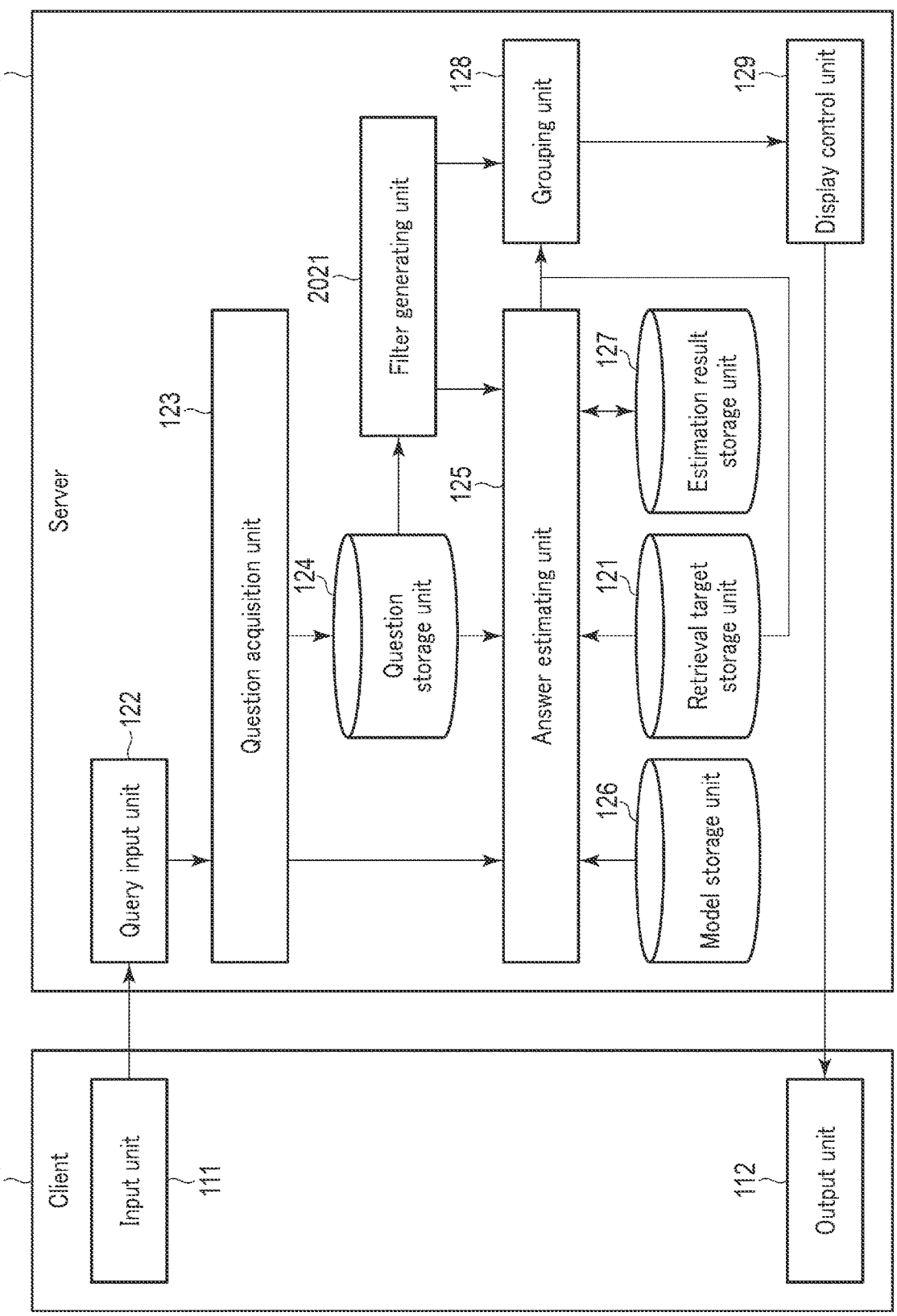
FIG. 20 is a block diagram illustrating an information processing system according to a third embodiment.

FIG. 20 schematically illustrates an information processing system 2000 according to the third embodiment. In FIG. 20, the same portions as those illustrated in FIG. 1 are denoted by the same reference numerals, and redundant description is omitted. As illustrated in FIG. 20, the information processing system 2000 includes a client 110 and a server 2020 as an information processing apparatus according to the third embodiment. The server 2020 is obtained by adding a filter generating unit 2021 to the server 120 illustrated in FIG. 1.

A question storage unit 124 stores a question list including a plurality of questions. The question list may include a plurality of questions prepared in advance and additional information related to these questions. The plurality of questions prepared in advance may be created manually. Furthermore, the plurality of questions prepared in advance may be automatically created by extracting a plurality of sentences or characteristic keywords from a document such as a safety manual and converting each sentence or keyword into a question by a method in the same way of a question acquisition unit 123. The question list is used not only for retrieval processing using a query input by the user but also for subsequent candidate generation of filter.

FIG. 21 illustrates an example of a question list stored in the question storage unit 124. In the example illustrated in FIG. 21, the additional information includes time information indicating registration date and time, use information indicating the number of times of selection, and category information indicating a category. The additional information does not need to include all of these three items, and only needs to include items used by the filter generating unit 2021.

The registration date and time indicates the date and time when the question is registered in the question list. For the question prepared in advance, the date and time when the question list is created may be set as the registration date and time. For the question added based on the query input by the user, the date and time when the user inputs the query may be set as the registration date and time.

The number of times of use indicates the number of times a question is used for retrieval. For example, the number of times of use is a sum of the number of times a question is used for retrieval using a query input by the user and the number of times a question is used for filtering. For example, in a case where the same question as the question acquired by the question acquisition unit 123 when the user inputs the query exists in the question list, the number of times of use is increased by one. In addition, in a case where the user selects a question from the questions presented as candidates of filter and selects any one of answer groups presented thereafter, the number of times of use is increased by one.

The category indicates a category of content in which the question may be used for retrieval. For the question prepared in advance, the category may be assigned when the question is created. For the question added based on the query input by the user, the category may be given by estimating the category of the keyword input as the query by the user or the keyword extracted from the sentence input as the query by the user. Any keyword classification method may be used for category estimation. As a keyword classification method, for example, a method of using a correspondence table between keywords and categories or ontology, a method of using word2vec to deal with variability of a keyword or a word of another notation having the same meaning, a method of constructing a model for classifying keywords into categories, and the like can be considered.

The question storage unit 124 may store a question use history together with the question list. As illustrated in FIG. 22, the question use history includes three fields for storing a question ID, a use date and time, and a user ID. The question ID is identification information for identifying the question, the use date and time indicates the date and time when the question is used, and the user ID is information for identifying the user who used the question. Each time a question is used for retrieval, a record including a question ID, a use date and time, and a user ID is added to the question use history. The question use history is an example of the additional information.

The filter generating unit 2021 generates candidates of filter including a question for filtering the content to be retrieved. The content to be retrieved may be a plurality of images stored in a retrieval target storage unit 121 as in the first embodiment, or may be a moving image selected by the user as in the second embodiment. The candidate of filter may further include an answer to a question for filtering. For example, the candidate of filter may include an answer to the question for filtering for each of the plurality of images stored in the retrieval target storage unit 121, or may include an answer to the question for filtering for each of the plurality of frames included in the moving image selected by the user.

Specifically, the filter generating unit 2021 selects one or a plurality of questions from the question list as a question for filtering, and generates an answer estimation result indicating an answer to the question for filtering for each of the plurality of images. Though the filter generating unit 2021 typically selects questions from the question list, the case where the filter generating unit 2021 selects one question from the question list will be described for the purpose of simplification. The filter generating unit 2021 generates an answer estimation result using the answer estimating unit 125. In other words, the filter generating unit 2021 causes the answer estimating unit 125 to estimate an answer to the question for filtering. Note that the filter generating unit 2021 may be configured to perform answer estimation by a method similar to that of the answer estimating unit 125 in order to generate an answer estimation result.

The filter generating unit 2021 may use the additional information included in the question list to select a question for filtering. For example, the filter generating unit 2021 selects the latest question that is not used in the current retrieval session as a question for filtering. By selecting the latest question, the most recently added question can be presented. Alternatively, the filter generating unit 2021 may use a question that is not used in the current retrieval session and has the largest number of times of use as a question for filtering. By selecting a question with the largest number of times of use, it is possible to present a question that is easy to use.

The filter generating unit 2021 may use a category supplementarily to select a question for filtering. The category is used to narrow down selection candidates in a case where the question storage unit 124 stores many questions. For example, the filter generating unit 2021 acquires or estimates the category of the moving image selected as the retrieval target by the user, selects a question of a category matching the category of the moving image as a selection candidate, and selects a question from the selection candidates in other items (for example, registration date and time or the number of times of selection). The category of the moving image is often given in advance if the moving image to be retrieved is provided by a moving image sharing service or the like. The category estimation may use existing category classification technologies. For example, the filter generating unit 2021 may classify a category of a moving image from frames included in the moving image. Furthermore, the filter generating unit 2021 may convert the audio of the moving image into text by speech recognition and classify the category of the moving image from the text. The filter generating unit 2021 may estimate a category of the query input by the user and select a question for narrowing retrieval from among questions of a category matching the estimated category.

The filter generating unit 2021 may use a question use history stored in the question storage unit 124 to select a question for narrowing retrieval. The filter generating unit 2021 may select a question having a large number of recent uses (for example, the number of times of use in the latest one week) as the question for filtering. The filter generating unit 2021 may select a question selected by a user having a similar selection tendency to the user who is currently performing the retrieval as the question for filtering. This can be achieved by using a collaborative filtering technology. It is possible to present a narrowing candidate suitable for the current situation or the user rather than selecting a question for filtering based on the number of times of use.

The candidate of filter can be generated before or after the user inputs the query. In a case where the candidate is generated after the user inputs the query, the filter generating unit 2021 may select a question for filtering from the question list based on the input query. In a case where a document related to scene retrieval or image retrieval such as a safety manual is prepared in advance, the filter generating unit 2021 may extract keywords co-occurring with keywords included in the input query from the document and select a question including at least one of the extracted keywords as a question for filtering. For example, the filter generating unit 2021 calculates the co-occurrence rates of each keyword in the document and the keywords included in the input query, extracts keywords having the highest calculated co-occurrence rate or having the calculated co-occurrence rate higher than a predetermined value from the document, and selects one or a plurality of questions from among the questions including the extracted keyword as the question for filtering. The co-occurrence rate of the first keyword and the second keyword may be calculated, for example, by counting the number of sentences including both the first keyword and the second keyword in the document. By selecting a question for filtering based on the input query, it is possible to present a question highly related to the input query.

The display control unit 129 presents the candidate generated by the filter generating unit 2021 before or after the user inputs the query. In the present embodiment, the display control unit 129 presents the candidates of filter in response to the user inputting the query.

Figure 23:
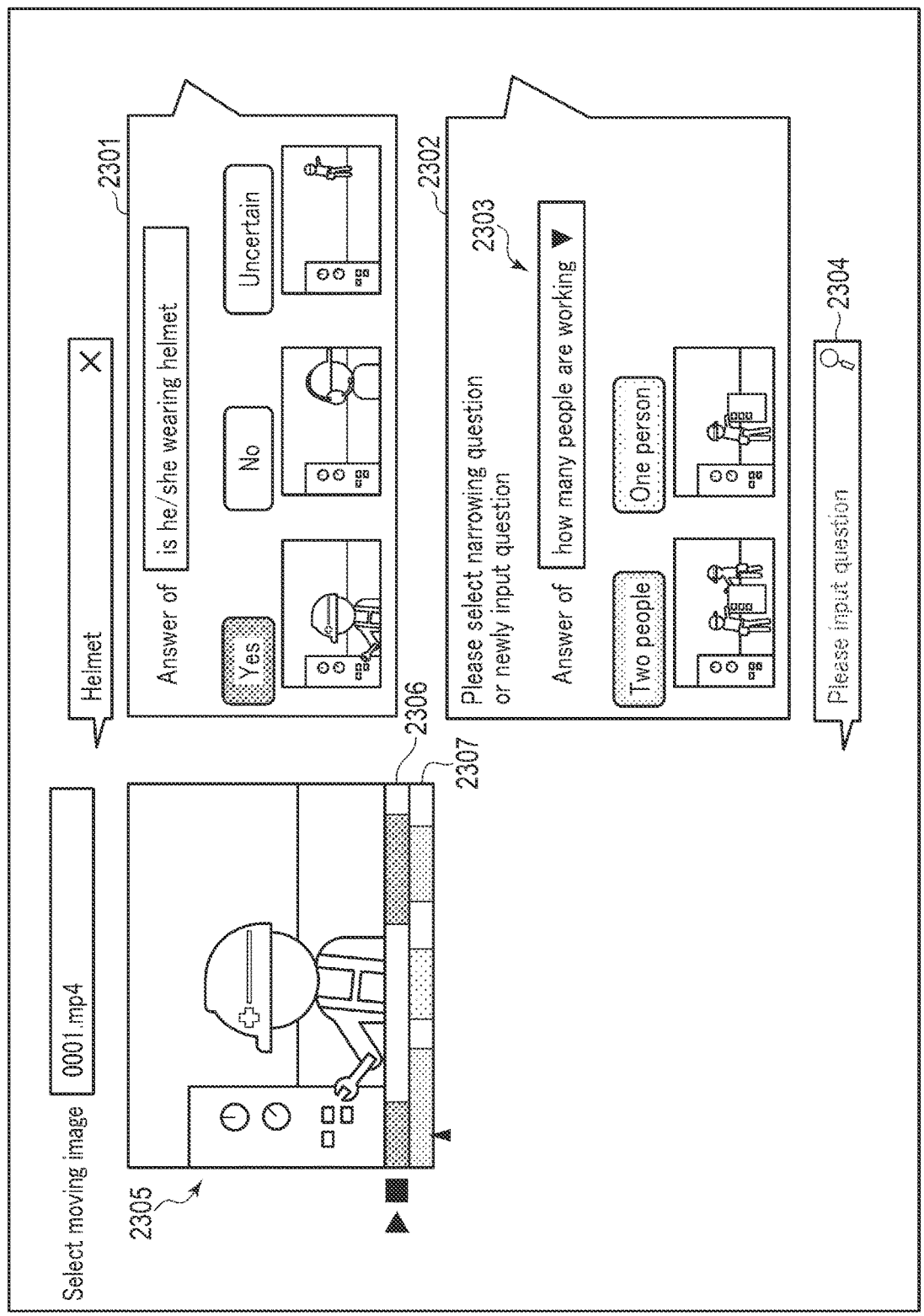
FIG. 23 is a diagram illustrating a retrieval screen according to the third embodiment.

FIG. 23 schematically illustrates an example of presenting a candidate of filer. In the example illustrated in FIG. 23, the user selects a moving image and inputs a query "helmet". The server 2020 displays a scene retrieval result 2301 in response to the moving image selection and the query input, and presents a candidate of filter 2302 and an additional text input form 2304 in response to the user selecting the group of the answer "Yes". In the example illustrated in FIG. 23, the server 2020 displays one candidate, and enables selection of the candidate to be displayed by a drop-down 2303. Alternatively, a plurality of candidates may be displayed simultaneously. In this manner, by displaying the candidate of filter 2302 and the additional text input form 2304, it is possible to interactively advance the retrieval.

In a lower portion of a moving image display area 2305, a seek bar 2306 indicating a retrieval result using the input query and a seek bar 2307 indicating a filtering result are arranged in parallel. Each of the seek bars 2306 and 2307 indicates a time at which a frame belonging to an individual answer group is located. In a case where the user inputs an additional query, a seek bar indicating a result of the retrieval using the additional query is added below the two seek bars 2306 and 2307. Note that the plurality of seek bars may be overlapped in a semitransparent manner.

The screen is configured to allow selection of one of the answer groups displayed as a result of the retrieval using the input query. Furthermore, the screen is configured to allow selection of one of the answer groups displayed as a result of the filtering.

The filter generating unit 2021 updates the result of the narrowing retrieval in response to the user selecting one of the answer groups displayed as the result of the retrieval using the input query. Before the selection of the answer group, the filtering uses all frames included in the moving image selected by the user as targets. After selecting the answer group, the filtering uses frames belonging to the group selected by the user as targets. Referring again to the example illustrated in FIG. 23, the user has selected the group of the answer "Yes". In this case, the filtering uses frames belonging to the group of the answer "Yes" as targets. At least one worker appears in the frame belonging to the group of the answer "Yes". Therefore, the candidate does not include the answer of "0 people". In a case where the user cancels the selection of the group of the answer "Yes", the filter generating unit 2021 updates the candidate for the entire moving image. In this case, as a result of the filtering, a group of the answer "0 people" is also displayed. The representative image is also selected for the group of the answer "0 people".

Next, an operation of the server 2020 will be described. Here, a case where the retrieval target is a moving image selected by the user as described in the second embodiment will be mainly described.

When a moving image is added to the retrieval target storage unit 121, the server 2020 performs the processing illustrated in the moving image addition method described with reference to FIG. 18.

When a query is input by the user, the server 2020 performs retrieval using the input query, similarly to the moving image scene retrieval method described with reference to FIGS. 19A and 19B. Following the retrieval using the input query, the server 2020 performs processing of presenting a candidate of filter to be described later.

Figure 24:
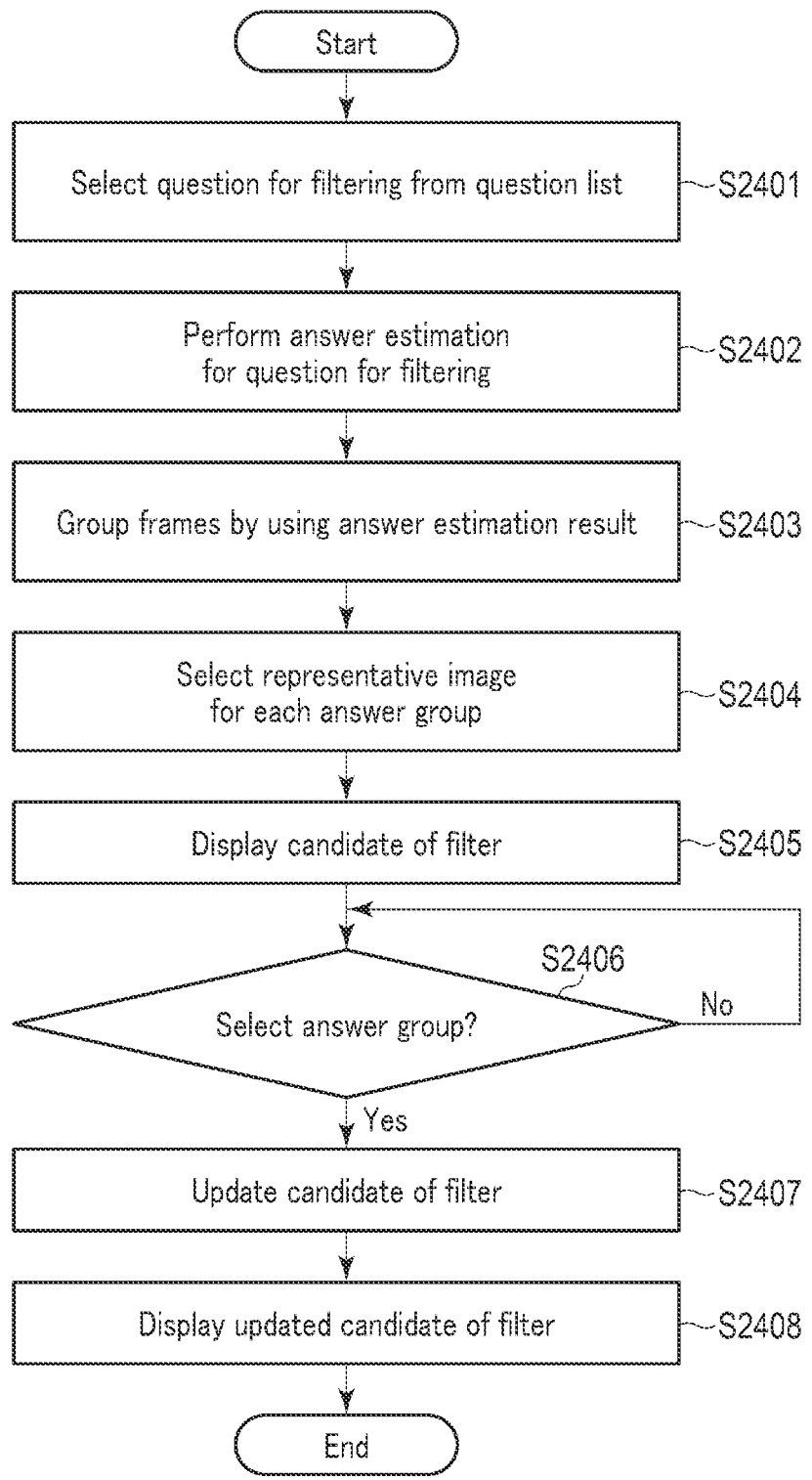
FIG. 24 is a flowchart illustrating a candidate of filter presentation method according to the third embodiment.

FIG. 24 schematically illustrates a procedure example of a candidate-of-filter presentation method according to the third embodiment. The candidate-of-filter presentation method illustrated in FIG. 24 is executed by the server 2020.

In step S2401 of FIG. 24, the filter generating unit 2021 selects a question for filtering from the question list. For example, the filter generating unit 2021 uses an input query to select a question for filtering from the question list. Specifically, the filter generating unit 2021 selects a question including a keyword co-occurring with a keyword included in the input query from the question list as a question for filtering. Here, in order to simplify the description, a case where the filter generating unit 2021 selects one question will be described.

In step S2402, the filter generating unit 2021 generates an answer estimation result indicating an answer to the question for filtering for each of a plurality of frames included in the moving image. The filter generating unit 2021 performs answer estimation in a similar manner to the series of processing illustrated in steps S1906 to S1914 of FIG. 19B to obtain an answer estimation result.

In step S2403, the grouping unit 128 classifies frames into a plurality of answer groups by using the answer estimation result. In step S2404, the display control unit 129 selects a representative image from the frames included in the answer group for each answer group. In step S2405, the display control unit 129 displays a candidate of filter including a question for filtering and a result of grouping frames.

In a case where the filter generating unit 2021 selects a plurality of questions for filtering, an answer estimation result is generated and grouping is performed for each question for filtering.

In step S2406, the filter generating unit 2021 waits for the user to select one answer group indicated as a retrieval result based on the input query. When the answer group is selected (step S2406; Yes), the flow proceeds to step S2407.

In step S2407, the filter generating unit 2021 updates the candidate of filter using the frames included in the selected answer group as a target. In step S2408, the display control unit 129 displays the updated candidate.

The first to third embodiments may be combined with existing technologies such as image retrieval using a keyword. For example, the image retrieval technology according to the first embodiment can be applied to retrieval results obtained by image retrieval using a keyword.

As illustrated in FIG. 25, it is assumed that a normal image retrieval is performed with the keyword of "A100"

which is the name of the sneakers. The retrieval results include product images of sneakers specified by the keyword, images of sneakers specified by the keyword, images of the sneakers outfit, and the like.

While the retrieval result is displayed, the user inputs a question "Is he/she wearing sneakers?" as an additional query. When the image retrieval according to the first embodiment is performed on the input question, the images are classified into an image of wearing sneakers of A100 and an image of illustrating sneakers of A100 but not wearing them (product image or the like).

Figure 26:
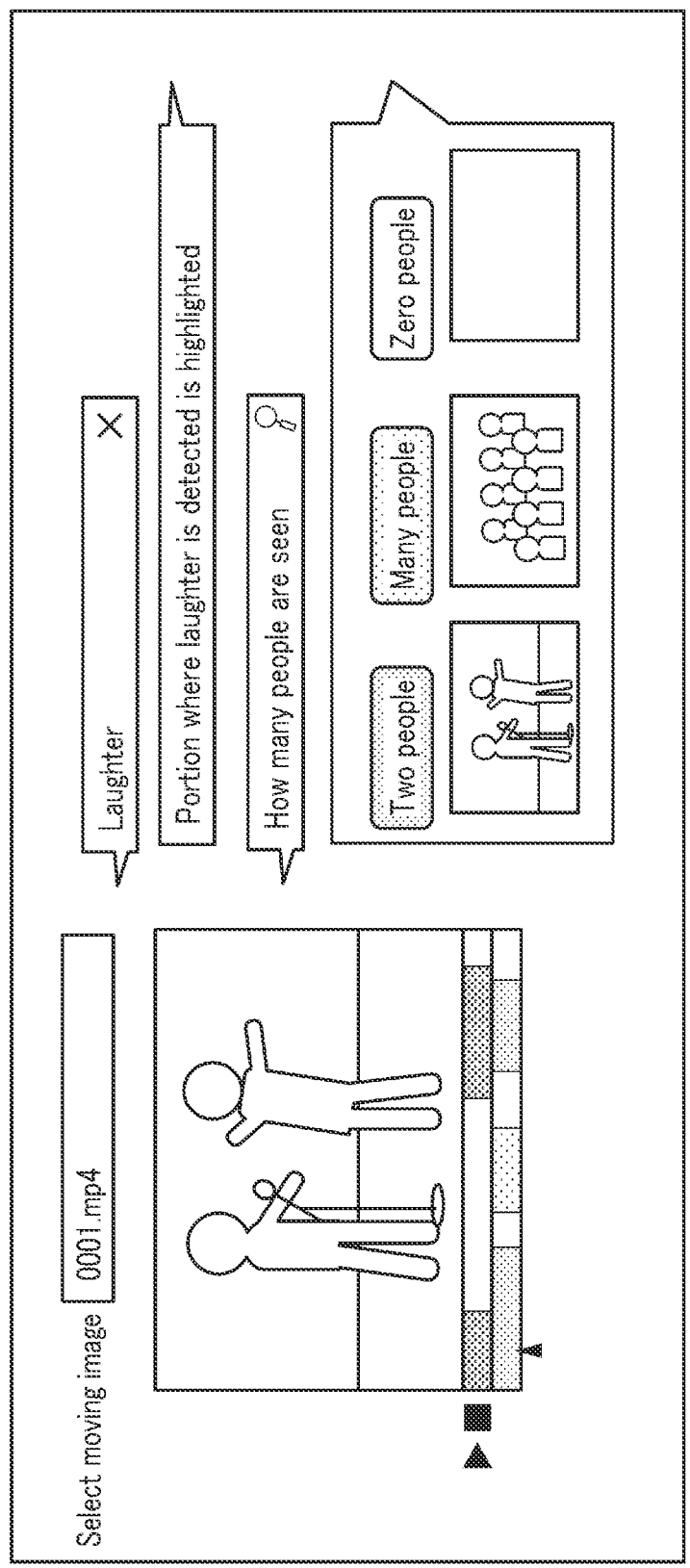
FIG. 26 is a diagram illustrating application of an information processing technology according to an embodiment.

In addition, the image retrieval technology according to the embodiment may be combined with a retrieval technology of an audio event such as laughter. For example, as illustrated in FIG. 26, a portion including laughter is detected from a moving image by a detection technology of an audio event, and the image retrieval technology according to the embodiment is applied to the detected portion.

As described above, in the third embodiment, the server 2020 presents the candidate of filter including the question useful for the filtering for the retrieval result based on the input query. Since the candidate of filter is a viewpoint of narrowing down, it is not narrow down too much unlike the filtering using the keyword, and the user can easily retrieve a desired scene.

Fourth Embodiment

In a fourth embodiment, a function of supporting creation of a rule described in a safety manual or the like, with reference to a designated moving image will be described. A configuration of an information processing apparatus according to the fourth embodiment is similar to that of the server 2020 according to the third embodiment. Also in the fourth embodiment, an information processing system 2000 illustrated in FIG. 20 is referred to.

A query input unit 122 is configured to be able to input a long sentence including a plurality of sentences. For example, a rule creator inputs a rule to be described in the safety manual to the query input unit 122. The server 2020 divides the sentence input to the query input unit 122 into a plurality of sentences and converts each sentence into a question. The server 2020 generates an answer group for each question obtained by the conversion.

The server 2020 generates a plurality of narrowing candidates at the time of query input and presents the generated narrowing candidates as recommended additional rules. As an example, the server 2020 specifies a keyword having a high co-occurrence rate with a keyword included in a sentence input by the rule creator in another safety manual, extracts a sentence including the specified keyword from another safety manual, and generates a question of a narrowing candidate from the extracted sentence.

FIG. 27 illustrates an example of a screen according to the fourth embodiment. As illustrated in FIG. 27, the screen includes a text input form 2701, a moving image display area 2702, a retrieval result display area 2703, and a proposal display area 2704. The retrieval result display area 2703 displays a retrieval result including a plurality of questions based on the query input in the text input form 2701. The proposal display area 2704 displays questions as additional rules to be proposed to the user. In the retrieval result display area 2703 and the proposal display area 2704, the matching rate is displayed for each answer group. The matching rate is a value obtained by dividing the number of frames belonging to the group by the total number of frames obtained by sampling.

When the user selects one of the answer groups, the corresponding portion is colored on the seek bar in the moving image display area 2702. In a case where an answer group is selected for a plurality of questions, a plurality of seek bars may be displayed in parallel.

As described above, in the fourth embodiment, in a case where the rule creator desires to create a rule based on a moving image, the rule creator can propose additional rules together with the display of the matching rate. As a result, the rule creator does not need to consider the rule while seeking the moving image by himself/herself, and labor is reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A non-transitory computer readable medium storing computer executable instructions executable by a processor of an information processing apparatus, the information processing apparatus including a storage storing a machine learning model trained to estimate an answer based on a question in a predetermined form and a piece of content as inputs, and the instructions controlling the processor to execute processes comprising:
   providing a user interface;
   acquiring a query input by a user via the user interface, the query being input in the predetermined form or in a form different from the predetermined form;
   in response to determining that the query is input in the form different from the predetermined form, converting the query into a first question having the predetermined form;
   inputting the first question and each of pieces of content to the machine learning model to thereby generate a plurality of first answer estimation results, each first answer estimation result including the answer to the first question estimated using the machine learning model for a respective one of the pieces of content;
   selecting a second question from among questions included in a question list;
   inputting the second question and each of the pieces of content to the machine learning model to thereby generate a plurality of second answer estimation results, each second answer estimation result including the answer to the second question estimated using the machine learning model for a respective one of the pieces of content;
   classifying the pieces of content into first groups by using the first answer estimation results and second groups by using the second answer estimation results, and generating data comprising a first retrieval result indicating content belonging to each of the first groups and a second retrieval result indicating content belonging to each of the second groups; and
   displaying the second retrieval result together with the first retrieval result,
   wherein the machine learning model is a visual question answering (VQA) model.

2. The medium according to claim 1, wherein:
the displaying the second retrieval result together with the first retrieval result includes selectably displaying the first groups, and
the processes further include:
classifying, in response to selection of one of the first groups, content belonging to the selected first group into the second groups by using the second retrieval result, and generating a third retrieval result indicating content belonging to each of the second groups; and
displaying the third retrieval result together with the first retrieval result.

3. The medium according to claim 1, wherein the processes further include adding the first question to the question list.

4. The medium according to claim 1, wherein:
the question list further includes time information indicating a date and time when each of the questions is registered in the question list or a date and time when each of the questions is used for retrieval, and
the selecting the second question includes selecting the second question from the questions based on the time information.

5. The medium according to claim 1, wherein:
the question list further includes use information indicating the number of times the questions have been used for retrieval, and
the selecting the second question includes selecting the second question from the questions based on the use information.

6. The medium according to claim 1, wherein the selecting the second question includes:
extracting a second keyword co-occurring with a first keyword included in the input query from a document prepared in advance; and
selecting a question including the second keyword from the questions as the second question.

7. The medium according to claim 1, wherein:
the converting the query includes transforming the query from the form different from the predetermined form into the predetermined form; and
wherein the form different from the predetermined form is a text, an image, an audio, or a combination thereof, and the predetermined form is a text, an image, an audio, a numerical value, or a combination thereof.

8. The medium according to claim 1, wherein the pieces of content are images.

9. The medium according to claim 8, wherein the images are frame images included in a moving image.

10. The medium according to claim 8, wherein the processes further include:
selecting a representative image from among images belonging to each of the first groups; and
displaying answers corresponding to the first groups in association with the representative image.

11. The medium according to claim 10, wherein:
the images are associated with time information, and
the selecting the representative image includes selecting the representative image from among the images belonging to each of the first groups based on the time information.

12. The medium according to claim 10, wherein:
each first answer estimation result further includes a certainty factor of the answer to the first question for its respective one of the pieces of content, and
the selecting the representative image includes selecting the representative image from among the images belonging to each of the first groups based on the certainty factor.

13. The medium according to claim 10, wherein:
each first answer estimation result further includes grounding information indicating a grounding of the answer to the first question for its respective one of the pieces of content, and
the information processing method further includes displaying the grounding information corresponding to the representative image in a superimposed manner on the representative image.

14. The medium according to claim 13, wherein:
the grounding information includes area information indicating an area serving as the grounding, and
the selecting the representative image includes selecting the representative image from among the images belonging to each of the first groups based on a size of the area indicated by the area information.

15. The medium according to claim 1, wherein the classifying comprises grouping the pieces of content into at least two groups, based on the answer to the question estimated for each of the pieces of content using the machine learning model, such that pieces of content having same estimated answers are included in a same group.

16. An information processing method executed by a computer of an information processing apparatus, the information processing apparatus including a storage storing a machine learning model trained to estimate an answer based on a question in a predetermined form and a piece of content as inputs, and the method comprising:
providing a user interface;
acquiring a query input by a user via the user interface, the query being input in the predetermined form or in a form different from the predetermined form;
in response to determining that the query is input in the form different from the predetermined form, converting the query into a first question having the predetermined form;
inputting the first question and each of pieces of content to the machine learning model to thereby generate a plurality of first answer estimation results, each first answer estimation result including the answer to the first question estimated using the machine learning model for a respective one of the pieces of content;
selecting a second question from among questions included in a question list;
inputting the second question and each of the pieces of content to the machine learning model to thereby generate a plurality of second answer estimation results, each second answer estimation result including the answer to the second question estimated using the machine learning model for a respective one of the pieces of content;
classifying the pieces of content into first groups by using the first answer estimation results and second groups by using the second answer estimation results, and generating data comprising a first retrieval result indicating content belonging to each of the first groups and a second retrieval result indicating content belonging to each of the second groups; and
displaying the second retrieval result together with the first retrieval result,
wherein the machine learning model is a visual question answering (VQA) model.

17. An information processing apparatus comprising:
a storage storing a machine learning model trained to estimate an answer based on a question in a predetermined form and a piece of content as inputs; and
a processing circuit configured to:
provide a user interface;
acquire a query input by a user via the user interface, the query being input in the predetermined form or in a form different from the predetermined form;
in response to determining that the query is input in the form different from the predetermined form, convert the query into a first question having the predetermined form;
input the first question and each of pieces of content to the machine learning model to thereby generate a plurality of first answer estimation results, each first answer estimation result including the answer to the first question estimated using the machine learning model for a respective one of the pieces of content;
select a second question from among questions included in a question list;
input the second question and each of the pieces of content to the machine learning model to thereby generate a plurality of second answer estimation results, each second answer estimation result including the answer to the second question estimated using the machine learning model for a respective one of the pieces of content;
classify the pieces of content into first groups by using the first answer estimation results and second groups by using the second answer estimation results, and generate data comprising a first retrieval result indicating content belonging to each of the first groups and a second retrieval result indicating content belonging to each of the second groups; and
displaying the second retrieval result together with the first retrieval result,
wherein the machine learning model is a visual question answering (VQA) model.

* * * * *